(12) United States Patent
Zhao et al.

(10) Patent No.: US 10,845,878 B1
(45) Date of Patent: Nov. 24, 2020

(54) INPUT DEVICE WITH TACTILE FEEDBACK

(71) Applicant: Apple Inc., Cupertino, CA (US)

(72) Inventors: Xianwei Zhao, Cupertino, CA (US); Michael Vosgueritchian, Cupertino, CA (US); Qiliang Xu, Cupertino, CA (US); Zheng Gao, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 201 days.

(21) Appl. No.: 15/499,576

(22) Filed: Apr. 27, 2017

Related U.S. Application Data

(60) Provisional application No. 62/366,607, filed on Jul. 25, 2016.

(51) Int. Cl.
*G06F 3/01* (2006.01)
*G06F 3/041* (2006.01)
*G06F 3/02* (2006.01)
*G06F 3/0488* (2013.01)
*G06F 3/044* (2006.01)

(52) U.S. Cl.
CPC ............ *G06F 3/016* (2013.01); *G06F 3/0202* (2013.01); *G06F 3/044* (2013.01); *G06F 3/0414* (2013.01); *G06F 3/04886* (2013.01); *G06F 2203/04108* (2013.01)

(58) Field of Classification Search
None
See application file for complete search history.

(56) References Cited

U.S. PATENT DOCUMENTS

| | | |
|---|---|---|
| 5,196,745 A | 3/1993 | Trumper et al. |
| 5,293,161 A | 3/1994 | MacDonald et al. |
| 5,424,756 A | 6/1995 | Ho et al. |
| 5,434,549 A | 7/1995 | Hirabayashi et al. |
| 5,436,622 A | 7/1995 | Gutman et al. |
| 5,668,423 A | 9/1997 | You et al. |
| 5,739,759 A | 4/1998 | Nakazawa et al. |
| 6,084,319 A | 7/2000 | Kamata et al. |
| 6,342,880 B2 | 1/2002 | Rosenberg et al. |
| 6,373,465 B2 | 4/2002 | Jolly et al. |
| 6,388,789 B1 | 5/2002 | Bernstein |
| 6,438,393 B1 | 8/2002 | Surronen |

(Continued)

FOREIGN PATENT DOCUMENTS

| | | |
|---|---|---|
| CN | 101036105 | 9/2007 |
| CN | 101409164 | 4/2009 |

(Continued)

OTHER PUBLICATIONS

Hasser et al., "Preliminary Evaluation of a Shape-Memory Alloy Tactile Feedback Display," Advances in Robotics, Mechantronics, and Haptic Interfaces, ASME, DSC—vol. 49, pp. 73-80, 1993.

(Continued)

*Primary Examiner* — Kenneth B Lee, Jr.
(74) *Attorney, Agent, or Firm* — Dorsey & Whitney LLP

(57) ABSTRACT

An electronic input device is disclosed. The input device includes an adaptive input surface allowing for controllably definable input regions and frictional feedback indicating a location of the input regions. The input device generates an electrostatic charge at the adaptive input surface to provide frictional feedback. The input device may be connectable to or integrated with another electronic computing device.

20 Claims, 14 Drawing Sheets

(56) References Cited

U.S. PATENT DOCUMENTS

| | | |
|---|---|---|
| 6,445,093 B1 | 9/2002 | Binnard |
| 6,493,612 B1 | 12/2002 | Bisset et al. |
| 6,693,622 B1 | 2/2004 | Shahoian et al. |
| 6,777,895 B2 | 8/2004 | Shimoda et al. |
| 6,822,635 B2 | 11/2004 | Shahoian |
| 6,864,877 B2 | 3/2005 | Braun et al. |
| 6,952,203 B2 | 10/2005 | Banerjee et al. |
| 6,988,414 B2 | 1/2006 | Ruhrig et al. |
| 7,068,168 B2 | 6/2006 | Girshovich et al. |
| 7,080,271 B2 | 7/2006 | Kardach et al. |
| 7,130,664 B1 | 10/2006 | Williams |
| 7,202,851 B2 | 4/2007 | Cunningham et al. |
| 7,234,379 B2 | 6/2007 | Claesson et al. |
| 7,253,350 B2 | 8/2007 | Noro et al. |
| 7,276,907 B2 | 10/2007 | Kitagawa et al. |
| 7,323,959 B2 | 1/2008 | Naka et al. |
| 7,339,572 B2 | 3/2008 | Schena |
| 7,355,305 B2 | 4/2008 | Nakamura et al. |
| 7,370,289 B1 | 5/2008 | Ebert et al. |
| 7,392,066 B2 | 6/2008 | Hapamas |
| 7,423,631 B2 | 9/2008 | Shahoian et al. |
| 7,508,382 B2 | 3/2009 | Denoue et al. |
| 7,570,254 B2 | 8/2009 | Suzuki et al. |
| 7,656,388 B2 | 2/2010 | Schena et al. |
| 7,667,371 B2 | 2/2010 | Sadler et al. |
| 7,667,691 B2 | 2/2010 | Boss et al. |
| 7,675,414 B2 | 3/2010 | Ray |
| 7,710,397 B2 | 5/2010 | Krah et al. |
| 7,710,399 B2 | 5/2010 | Bruneau et al. |
| 7,741,938 B2 | 6/2010 | Kramlich |
| 7,755,605 B2 | 7/2010 | Daniel et al. |
| 7,798,982 B2 | 9/2010 | Zets et al. |
| 7,825,903 B2 | 11/2010 | Anastas et al. |
| 7,855,657 B2 | 12/2010 | Doemens et al. |
| 7,890,863 B2 | 2/2011 | Grant et al. |
| 7,893,922 B2 | 2/2011 | Klinghult et al. |
| 7,904,210 B2 | 3/2011 | Pfau et al. |
| 7,911,328 B2 | 3/2011 | Luden et al. |
| 7,919,945 B2 | 4/2011 | Houston et al. |
| 7,952,261 B2 | 5/2011 | Lipton et al. |
| 7,952,566 B2 | 5/2011 | Poupyrev et al. |
| 7,956,770 B2 | 6/2011 | Klinghult et al. |
| 7,976,230 B2 | 7/2011 | Ryynanen et al. |
| 8,002,089 B2 | 8/2011 | Jasso et al. |
| 8,040,224 B2 | 10/2011 | Hwang |
| 8,053,688 B2 | 11/2011 | Conzola et al. |
| 8,063,892 B2 | 11/2011 | Shahoian |
| 8,081,156 B2 | 12/2011 | Ruettiger |
| 8,125,453 B2 | 2/2012 | Shahoian et al. |
| 8,154,537 B2 | 4/2012 | Olien et al. |
| 8,174,495 B2 | 5/2012 | Takashima et al. |
| 8,174,512 B2 | 5/2012 | Ramstein et al. |
| 8,169,402 B2 | 6/2012 | Shahoian et al. |
| 8,217,892 B2 | 7/2012 | Meadors |
| 8,232,494 B2 | 7/2012 | Purcocks |
| 8,248,386 B2 | 8/2012 | Harrison |
| 8,253,686 B2 | 8/2012 | Kyung |
| 8,262,480 B2 | 9/2012 | Cohen et al. |
| 8,265,292 B2 | 9/2012 | Leichter |
| 8,265,308 B2 | 9/2012 | Gitzinger et al. |
| 8,344,834 B2 | 1/2013 | Niiyama |
| 8,345,025 B2 | 1/2013 | Seibert et al. |
| 8,351,104 B2 | 1/2013 | Zaifrani et al. |
| 8,378,797 B2 | 2/2013 | Pance et al. |
| 8,378,965 B2 | 2/2013 | Gregorio et al. |
| 8,384,316 B2 | 2/2013 | Houston et al. |
| 8,390,218 B2 | 3/2013 | Houston et al. |
| 8,390,594 B2 | 3/2013 | Modarres et al. |
| 8,400,027 B2 | 3/2013 | Dong et al. |
| 8,405,618 B2 | 3/2013 | Colgate et al. |
| 8,469,806 B2 | 6/2013 | Grant et al. |
| 8,471,690 B2 | 6/2013 | Hennig et al. |
| 8,493,177 B2 | 7/2013 | Flaherty et al. |
| 8,493,189 B2 | 7/2013 | Suzuki |
| 8,576,171 B2 | 11/2013 | Grant |
| 8,598,750 B2 | 12/2013 | Park |
| 8,598,972 B2 | 12/2013 | Cho et al. |
| 8,605,141 B2 | 12/2013 | Dialameh et al. |
| 8,614,431 B2 | 12/2013 | Huppi et al. |
| 8,619,031 B2 | 12/2013 | Hayward |
| 8,624,448 B2 | 1/2014 | Kaiser et al. |
| 8,633,916 B2 | 1/2014 | Bernstein et al. |
| 8,639,485 B2 | 1/2014 | Connacher et al. |
| 8,648,829 B2 | 2/2014 | Shahoian et al. |
| 8,681,130 B2 | 3/2014 | Adhikari |
| 8,717,151 B2 | 5/2014 | Forutanpour et al. |
| 8,730,182 B2 | 5/2014 | Modarres et al. |
| 8,749,495 B2 | 6/2014 | Grant et al. |
| 8,754,759 B2 | 6/2014 | Fadell et al. |
| 8,760,037 B2 | 6/2014 | Eshed et al. |
| 8,773,247 B2 | 7/2014 | Ullrich |
| 8,797,153 B2 | 8/2014 | Vanhelle et al. |
| 8,803,670 B2 | 8/2014 | Steckel et al. |
| 8,834,390 B2 | 9/2014 | Couvillon |
| 8,836,502 B2 | 9/2014 | Culbert et al. |
| 8,867,757 B1 | 10/2014 | Ooi |
| 8,872,448 B2 | 10/2014 | Boldyrev et al. |
| 8,878,401 B2 | 11/2014 | Lee |
| 8,907,661 B2 | 12/2014 | Maier et al. |
| 8,976,139 B2 | 3/2015 | Koga et al. |
| 8,981,682 B2 | 3/2015 | Delson et al. |
| 8,987,951 B2 | 3/2015 | Park |
| 9,008,730 B2 | 4/2015 | Kim et al. |
| 9,024,738 B2 | 5/2015 | Van Schyndel et al. |
| 9,030,424 B2 * | 5/2015 | Shih .................. G06F 3/016 345/173 |
| 9,054,605 B2 | 6/2015 | Jung et al. |
| 9,058,077 B2 | 6/2015 | Lazaridis et al. |
| 9,086,727 B2 | 7/2015 | Tidemand et al. |
| 9,104,285 B2 | 8/2015 | Colgate et al. |
| 9,122,330 B2 | 9/2015 | Bau et al. |
| 9,134,796 B2 | 9/2015 | Lemmons et al. |
| 9,172,669 B2 | 10/2015 | Swink et al. |
| 9,218,727 B2 | 12/2015 | Rothkopf et al. |
| 9,256,287 B2 | 2/2016 | Shinozaki et al. |
| 9,274,601 B2 | 3/2016 | Faubert et al. |
| 9,280,205 B2 | 3/2016 | Rosenberg et al. |
| 9,286,907 B2 | 3/2016 | Yang et al. |
| 9,304,587 B2 | 4/2016 | Wright et al. |
| 9,361,018 B2 | 6/2016 | Pasquero et al. |
| 9,396,629 B1 | 7/2016 | Weber et al. |
| 9,430,042 B2 | 8/2016 | Levin |
| 9,436,280 B2 | 9/2016 | Tartz et al. |
| 9,442,570 B2 | 9/2016 | Slonneger |
| 9,448,713 B2 | 9/2016 | Cruz-Hernandez et al. |
| 9,449,476 B2 | 9/2016 | Lynn et al. |
| 9,466,783 B2 | 10/2016 | Olien et al. |
| 9,489,049 B2 | 11/2016 | Li |
| 9,496,777 B2 | 11/2016 | Jung |
| 9,501,149 B2 | 11/2016 | Burnbaum et al. |
| 9,513,704 B2 | 12/2016 | Heubel et al. |
| 9,535,500 B2 | 1/2017 | Pasquero et al. |
| 9,539,164 B2 | 1/2017 | Sanders et al. |
| 9,557,830 B2 | 1/2017 | Grant |
| 9,600,037 B2 | 3/2017 | Pance et al. |
| 9,632,583 B2 | 4/2017 | Virtanen et al. |
| 9,829,981 B1 | 11/2017 | Ji |
| 9,927,902 B2 | 3/2018 | Burr et al. |
| 9,940,013 B2 | 4/2018 | Choi et al. |
| 2003/0117132 A1 | 6/2003 | Klinghult |
| 2005/0036603 A1 | 2/2005 | Hughes |
| 2005/0230594 A1 | 10/2005 | Sato et al. |
| 2006/0017691 A1 | 1/2006 | Cruz-Hernandez et al. |
| 2006/0209037 A1 | 9/2006 | Wang et al. |
| 2006/0223547 A1 | 10/2006 | Chin et al. |
| 2006/0252463 A1 | 11/2006 | Liao |
| 2007/0106457 A1 | 5/2007 | Rosenberg |
| 2007/0152974 A1 | 7/2007 | Kim et al. |
| 2008/0062145 A1 | 3/2008 | Shahoian |
| 2008/0084384 A1 | 4/2008 | Gregorio et al. |
| 2008/0111791 A1 | 5/2008 | Nikittin |
| 2009/0085879 A1 | 4/2009 | Dai et al. |
| 2009/0115734 A1 | 5/2009 | Fredriksson et al. |
| 2009/0166098 A1 | 7/2009 | Sunder |

(56) References Cited

U.S. PATENT DOCUMENTS

| | | |
|---|---|---|
| 2009/0167702 A1 | 7/2009 | Nurmi |
| 2009/0167704 A1 | 7/2009 | Terlizzi et al. |
| 2009/0174672 A1 | 7/2009 | Schmidt |
| 2009/0207129 A1 | 8/2009 | Ullrich et al. |
| 2009/0225046 A1 | 9/2009 | Kim et al. |
| 2009/0243404 A1 | 10/2009 | Kim et al. |
| 2009/0267892 A1 | 10/2009 | Faubert |
| 2009/0313542 A1 | 12/2009 | Cruz-Hernandez et al. |
| 2010/0116629 A1 | 5/2010 | Borissov et al. |
| 2010/0225600 A1 | 9/2010 | Dai et al. |
| 2010/0313425 A1 | 12/2010 | Hawes |
| 2010/0328229 A1 | 12/2010 | Weber et al. |
| 2011/0115754 A1 | 5/2011 | Cruz-Hernandez |
| 2011/0128239 A1 | 6/2011 | Polyakov et al. |
| 2011/0132114 A1 | 6/2011 | Siotis |
| 2011/0205038 A1 | 8/2011 | Drouin et al. |
| 2012/0056825 A1 | 3/2012 | Ramsay et al. |
| 2012/0062491 A1 | 3/2012 | Coni et al. |
| 2012/0127071 A1 | 5/2012 | Jitkoff et al. |
| 2012/0127088 A1 | 5/2012 | Pance et al. |
| 2012/0223824 A1 | 9/2012 | Rothkopf |
| 2012/0235942 A1 | 9/2012 | Shahoian |
| 2012/0319827 A1 | 12/2012 | Pance et al. |
| 2012/0327006 A1 | 12/2012 | Israr et al. |
| 2013/0016042 A1 | 1/2013 | Makinen et al. |
| 2013/0044049 A1 | 2/2013 | Biggs et al. |
| 2013/0207793 A1 | 8/2013 | Weaber et al. |
| 2013/0278401 A1 | 10/2013 | Flaherty et al. |
| 2014/0125470 A1 | 5/2014 | Rosenberg |
| 2014/0247219 A1* | 9/2014 | Pedersen ............... G06F 3/0202 345/168 |
| 2015/0097800 A1 | 4/2015 | Grant et al. |
| 2015/0116205 A1 | 4/2015 | Westerman et al. |
| 2015/0126070 A1 | 5/2015 | Candelore |
| 2015/0130730 A1 | 5/2015 | Harley et al. |
| 2015/0135121 A1 | 5/2015 | Peh et al. |
| 2015/0277562 A1 | 5/2015 | Bard et al. |
| 2015/0234493 A1 | 8/2015 | Parivar et al. |
| 2015/0338919 A1 | 11/2015 | Weber et al. |
| 2015/0349619 A1 | 12/2015 | Degner et al. |
| 2016/0011664 A1 | 1/2016 | Silvanto et al. |
| 2016/0116946 A1* | 4/2016 | Miller .................. G06F 1/1618 345/1.3 |
| 2016/0171767 A1 | 6/2016 | Anderson et al. |
| 2016/0209979 A1 | 7/2016 | Endo et al. |
| 2016/0239087 A1* | 8/2016 | Shih ...................... G06F 1/1626 |
| 2016/0277843 A1* | 9/2016 | Babayoff ............. H04R 17/005 |
| 2016/0328930 A1 | 11/2016 | Weber et al. |
| 2017/0003744 A1 | 1/2017 | Bard et al. |
| 2017/0024010 A1 | 1/2017 | Weinraub |
| 2017/0249024 A1 | 8/2017 | Jackson et al. |
| 2018/0004304 A1* | 1/2018 | Moseley ............... G06F 3/0202 |
| 2018/0004305 A1* | 1/2018 | Moseley ............... G06F 3/0414 |

FOREIGN PATENT DOCUMENTS

| | | |
|---|---|---|
| CN | 101663104 | 3/2010 |
| CN | 101872257 | 10/2010 |
| EP | 1686776 | 8/2006 |
| EP | 2743798 | 6/2014 |
| JP | 2004129120 | 4/2004 |
| JP | 2004236202 | 8/2004 |
| JP | 2010537279 | 12/2010 |
| JP | 2010540320 | 12/2010 |
| KR | 20050033909 | 4/2005 |
| TW | 2010035805 | 10/2010 |
| WO | WO2002/073587 | 9/2002 |
| WO | WO2006/091494 | 8/2006 |
| WO | WO2007/049253 | 5/2007 |
| WO | WO2007/114631 | 10/2007 |
| WO | WO2009/038862 | 3/2009 |
| WO | WO2010/129892 | 11/2010 |
| WO | WO2013/169303 | 11/2013 |
| WO | WO2014/066516 | 5/2014 |

OTHER PUBLICATIONS

Hill et al., "Real-time Estimation of Human Impedance for Haptic Interfaces," Stanford Telerobotics Laboratory, Department of Mechanical Engineering, Standford University, 6 pages, at least as early as Sep. 30, 2009.

Lee et al, "Haptic Pen: Tactile Feedback Stylus for Touch Screens," Mitsubishi Electric Research Laboratories, http://wwwlmerl.com, 6 pages, Oct. 2004.

* cited by examiner

INPUT DEVICE WITH TACTILE FEEDBACK

CROSS-REFERENCE TO RELATED APPLICATION(S)

This application is a nonprovisional patent application of and claims the benefit of U.S. Provisional Patent Application No. 62/366,607, filed Jul. 25, 2016 and titled "Input Device with Tactile Feedback," the disclosure of which is hereby incorporated herein by reference in its entirety.

FIELD

The described embodiments relate generally to computing input devices. More particularly, the present embodiments relate to touch-sensitive input devices having haptic feedback.

BACKGROUND

Traditional computing input devices, such as mice, keyboards, and trackpads, tend to operate using dedicated keys or buttons. The operation of each key or button may be tied to a particular function or command. However, traditional input devices lack the flexibility to accommodate expansive features offered by newer devices, operating systems, and software. As a further drawback, the dedicated keys or buttons of traditional input devices are unable to adapt to different user needs and preferences.

Alternative input devices, such as touch-input devices, appear to offer some greater flexibility for input scenarios and customization than older mechanical keyboards, mice, and similar input devices. However, touch input devices often have a flat, inflexible input surface that gives little or no tactile feedback to a user and may therefore be less desirable for many scenarios than traditional input devices.

SUMMARY

The present disclosure provides for an input device having an adaptive input surface and providing tactile feedback to a user. The input device may include, for example, a touch-based input surface over an adaptive display. Haptic feedback may be provided to a user through a controllable array of electrostatic electrodes which cause a user to perceive varying levels of friction across the surface. Thus an input device may define one or more user input regions corresponding to alphanumeric keys, and may further have an increased area of friction defining the input regions or the edges of input regions. Further feedback may be provided through additional haptic feedback elements, such as an actuator which produces the sensation of input surface movement.

An example embodiment may be an adaptable keyboard. The adaptable keyboard includes an enclosure housing a display and a cover sheet over the display defining an input surface. The display visually renders two user input regions defining keys of the adaptable keyboard. An array of electrodes between the cover sheet and the display provides variable frictional feedback to tactilely indicate the locations of the user input regions on the input surface. The adaptable keyboard further includes a force sensor which measures an amount of force applied to the input surface and a processing unit.

In some cases, the keyboard further includes a touch sensor, and the processing unit indicates actuation of a first user input region in response to the touch sensor detecting a touch within the first user input region and the force sensor detecting an amount of force above a threshold value. In some cases, the processing unit causes the frictional feedback within a user input region to change in response to the amount of force measured by the force sensor. In some cases, the keyboard includes memory storing multiple keyboard layouts, each defining locations of the user input regions.

Another embodiment may be an input device having a configurable interface. The input device includes a cover sheet defining an input surface over a display which visually indicates an array of keys on the input surface. The input device further includes an array of electrodes which provide a first frictional feedback within each of the array of keys and a second frictional feedback distinct from the first frictional feedback along a periphery of each key.

Still another embodiment may be a method of providing friction feedback on an input device. The method includes the steps of detecting a location of an object near a surface of the input device and defining a user input region along the surface based on the location of the object. The method further includes the steps of visually rendering a location of the user input region on a display positioned below the surface and providing, using an array of electrodes, a frictional feedback at a periphery of the user input region.

BRIEF DESCRIPTION OF THE DRAWINGS

The disclosure will be readily understood by the following detailed description in conjunction with the accompanying drawings, wherein like reference numerals designate like structural elements.

Figure 1:
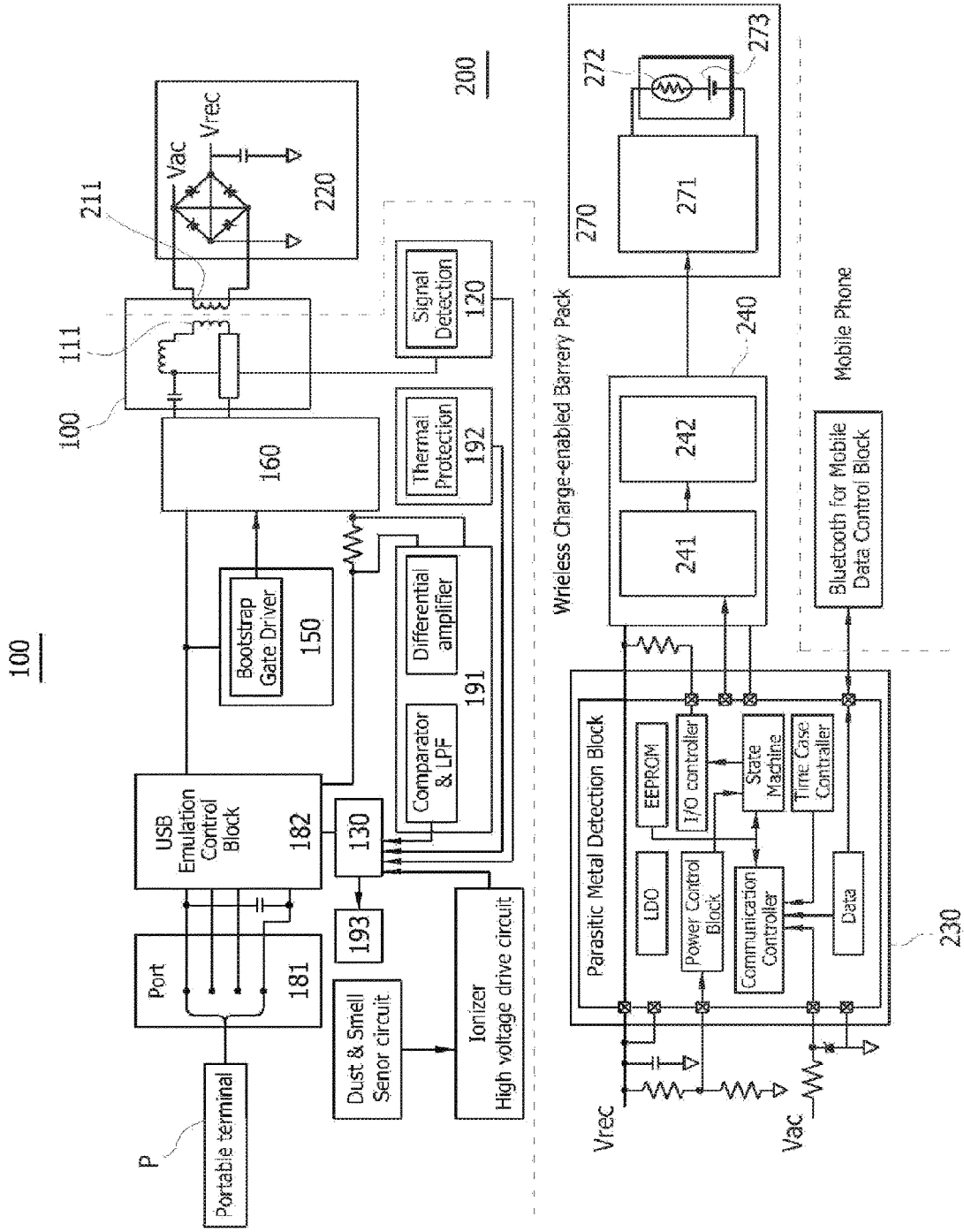
FIG. 1 depicts an example input device having user input regions providing frictional feedback.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, they are intended to cover alternatives, modifications, and equivalents as can be included within the spirit and scope of the described embodiments as defined by the appended claims.

The following disclosure relates to an adaptive input device providing a variable or configurable tactile or frictional feedback to a user. Using a conductive layer (e.g., an array of electrodes), the device may be configured to apply an electrostatic charge to an input surface or other exterior surface of the device. The electrostatic charge may alter or modify a tactile or touch-based stimulus that is perceived by a user. In some cases, the tactile feedback may cause an increased (or decreased) friction or surface roughness between an object (e.g., the user's finger) and the exterior/input surface as the object is moved along the surface, for example by electrostatically attracting the user's finger to the surface.

The input device may have an adaptive input surface, and may controllably define one or more user input regions along the input surface. The input device may also include an array of electrodes which provide a variable or configurable frictional feedback. The electrodes may be individually controllable such that frictional feedback may vary across the input surface. The input device may further include macro haptic feedback elements which provide vertical motion at the surface causing a user to perceive a motion similar to a button press or click.

A particular embodiment of the input device may take the form of a keyboard-like device having an adaptive input surface in the place of traditional keys. The input device may detect the presence of an object such as a user's finger and define one or more user input regions on the adaptive input surface (e.g., virtual keys). The adaptive input surface may include an adaptive display to render visual information, such as an outline of an input region and an indication of its function. The input device may further include an array of electrodes below the input surface, which produce a variable electrostatic charge on the surface, which may produce sensations of higher and/or lower friction to a user operating the input device. These electrodes may, for example, indicate the shape or border of an input region through increased friction between the finger of a user and the input surface as the finger moves across the input region, or alternatively through increased friction at the edges (e.g., periphery) of the input region.

Other embodiments may include a macro haptic feedback element. The macro haptic feedback element may be an actuator positioned below the input surface and operable to move a portion or all of the input surface vertically. When a user's finger moves toward a virtual key, the macro haptic feedback element may cause the input surface to move vertically (e.g., upward to meet the finger, downward, or a combination of these movements) in order to provide the user with a sensation similar to the travel of a physical key. Other embodiments may have an array of macro haptic feedback elements to provide localized feedback in multiple locations at the same time.

Still other embodiments may define a customizable set of virtual keys. For example, the location and arrangement of a set of virtual keys may vary in accordance with user interaction, such as the initial placement of a user's fingers. The size, arrangement, spacing, and similar features of the virtual keys may be determined in this manner. Alternatively or additionally, the user may select preferred sizes, shapes, arrangement, and so forth of virtual keys through software and other preferences. Electrostatic friction and macro haptic feedback may also be customized, whether through user interaction, preferences, or software controls.

In some embodiments, the input device may include multiple dynamically configurable keyboard layouts. Layouts may be stored in a memory of the input device and allow a user to set a preferred layout or dynamically interact with the keyboard to choose among multiple layouts. For example, a user may place fingers on the input surface in a straight line to generate a standard layout, or alternatively place fingers in a curved pattern to generate an ergonomic layout. The keyboard layouts may include pre-defined input regions, a visual layout, and electrostatic friction and macro haptic feedback to replicate visually and tactilely the experience of typing on a mechanical keyboard on a dynamically configurable input region.

Other embodiments may provide for control of the adaptive input surface via software applications. For example, embodiments may be in communication with or integrated into an electronic device running one or more software applications. While a particular application is active on the electronic device, the input surface may be adapted to define input regions, graphical representations, and frictional and haptic feedback to enhance user interaction with the active application.

These and other embodiments are discussed below with reference to FIGS. 1-12. However, those skilled in the art will readily appreciate that the detailed description given herein with respect to these Figures is for explanatory purposes only and should not be construed as limiting.

FIG. 1 illustrates an example device 100 having an adaptive input surface with an array of electrodes to provide electrostatic friction feedback to a user. In the present embodiment, the device 100 is in the form of a stand-alone keyboard. Other example devices may include a desktop computing system (see FIG. 10), a laptop computing system (see FIGS. 8 and 9), a cover for a portable electronic device (see FIG. 11), a mouse, and so on. Example internal components of the device 100 are described below with respect to FIG. 12.

As shown in FIG. 1, the device 100 includes an enclosure 102 housing an adaptive input surface (e.g., a flat input surface) 104. In the present example, the adaptive input surface 104 is positioned on a top surface of the device 100, in the place of physical keys. Although shown without any physical keys, the device 100 may also include one or more physical keys, having dedicated or adaptive functions, such as power, illumination control, and/or user input. The input surface 104 may also be located on other parts of the device 100, or consume more or less of a surface of the device 100. For example, the adaptive input row may be positioned along the side of the device 100, adjacent to a top or bottom of a set of physical keys, or located in another region of the device 100.

The input surface 104 may have a color and/or finish that matches the color and/or finish of the enclosure 102. For example, the input surface 104 may be painted or otherwise treated to match the color and appearance of an aluminum or plastic enclosure 102. In some embodiments, a border region is formed around the perimeter of the input surface 104 that is configured to substantially match the appearance of the enclosure 102, while a central portion of the input surface 104 is transparent to facilitate the presentation of graphics and symbols.

The input surface 104 may be configured to operate as a touch-sensitive surface. For example, the input surface 104 may be configured to respond to a touch input and may include a touch sensor configured to determine the location of a touch on the input surface 104. The input surface 104 may be configured to receive a wide variety of touch inputs, which may be used to interpret a diverse set of commands or operations.

The input surface 104 may additionally or alternatively be configured to operate as a force-sensitive surface. The input surface 104 may include, for example, a force sensor configured to detect a location and/or amount of force applied to the input surface 104. The force sensor may be operably connected to force-sensing circuitry configured to estimate an amount of applied force. The force-sensing circuitry may output a signal or otherwise indicate an input in response to estimating an amount of force exceeding a threshold. The threshold amount may be fixed or variable, and more than one threshold may be provided corresponding to different inputs.

The input surface 104 may include an adaptable display. The adaptable display is configured to display visual indicia that corresponds to a user input region or virtual key 106. In some embodiments, the adaptable display may be self-illuminated or illuminated, though this is not required. One or more different sets of visual indicia may be displayed, depending on user preference and/or application control. The visual indicia may provide visual feedback to a user on the location of a set of virtual keys 106. The visual indicia may correspond to a function or command, which may also change depending on user preference or application control. Thus, touch selection of the same region of the input surface 104 may initiate or trigger a wide variety of functions or commands.

The input surface 104 may further include an array of friction-feedback electrodes. When activated, the electrodes may produce an electrostatic charge on the input surface 104, which may produce tactile feedback to a user in the form of modified friction as the user moves a finger across the input surface 104 where electrodes are active. The electrodes may be individually controllable such that at a given time the level of friction may vary at multiple locations across the input surface 104. The electrodes may also be sufficient in density to allow for frictional feedback at fine detail, such as an increased friction level surrounding an adaptively defined user input region, such as a virtual key 106. The electrodes may provide tactile feedback to a user on the location of a virtual key 106. The operation of the electrodes is described further below with respect to FIG. 3 (which also illustrates a stack-up of the input surface 104). The arrangement of the electrodes providing frictional feedback is described in further detail below with respect to FIG. 4.

The enclosure 102 may further house a macro haptic feedback element operably connected to the input surface 104 to provide further feedback to a user. The macro haptic feedback element may be, for example, an electromechanical actuator operative to move the input surface 104 vertically. This may provide to a user feedback simulating the pressing of a physical key. The macro haptic feedback is described in further detail below with respect to FIGS. 6A-F. The enclosure 102 may further house an acoustic element, such as a speaker, to provide auditory feedback. The auditory feedback may be a click or similar sound to indicate actuation of a key 106.

The input device 100 may provide an adaptive input surface 104. The input device 100 may include a computer memory storing multiple keyboard layouts defining various arrays of user input regions. The input device 100 may additionally or alternatively allow for input regions to be defined by software applications in communication with the input device 100. The adaptive display, friction-feedback electrodes, haptic elements, touch sensors, and/or force sensors may be configured to operate together to define the input regions (e.g., keyboard layouts) visually, tactilely, and for receiving inputs. The adaptability of the input surface 104 is further illustrated below with respect to FIGS. 7A-9.

As shown in FIG. 1, the device 100 includes an input surface 104 positioned at least partially within an enclosure 102. The enclosure may provide structural support to the device 100, and may include additional features such as a support stand 108. The enclosure may further enclose additional support structures for the input surface 104.

The device 100 may also include various other components or devices depicted or not depicted in FIG. 1. In particular, the device 100 may also include one or more ports or electrical connectors positioned along one or more sides of the enclosure 102. The ports may include, for example, a USB connection port, an IEEE 1394 data port, audio connection port, video connection port, or other electrical hardware port that is configured to transmit and/or receive signals or data. The ports may also include a power connection port that is configured to receive electrical power from an external source such as a wall outlet or other power source. The device 100 may also include a wired communication connection 110 for connecting to another device, or the device 100 may include wireless transmitters and/or receivers for communicating with another device. Other internal components may be included, such as a processing unit. Several such internal components are described below with respect to FIG. 12.

Figure 2:
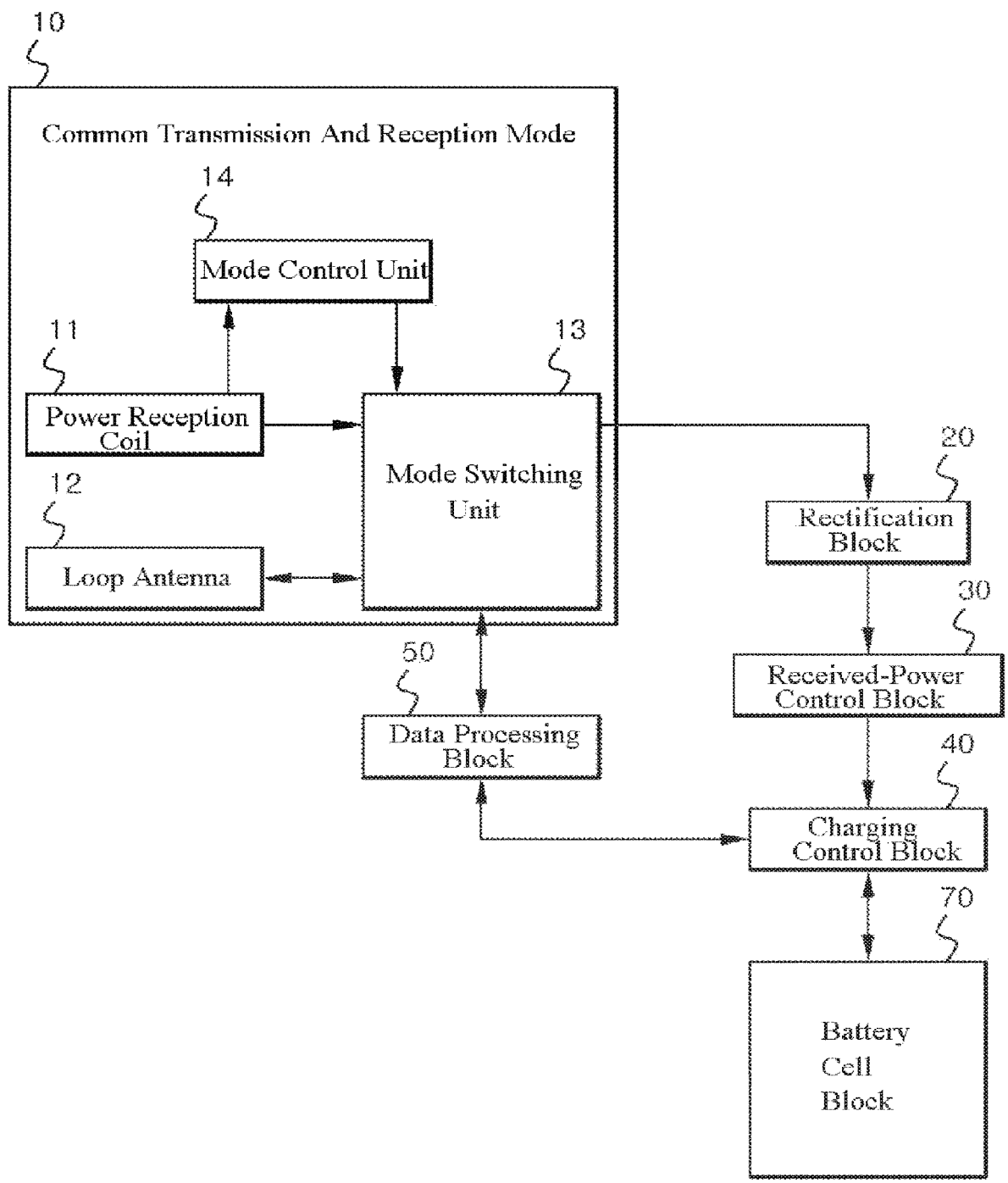
FIG. 2 depicts an example input device with user input regions providing differing frictional feedback.

As shown in FIG. 2, the input surface 204 may adaptively provide tactile or haptic feedback to a user in various ways. For example, multiple electrodes may be configured to modify friction across the input surface 204 to allow the frictional feedback to be adapted to a user's need or a particular input scenario. Multiple electrodes may allow for a complex surface, with varying levels of friction in defined input regions 212a, 212b as well as various types of frictional sensations.

FIG. 2 illustrates an example device 200 with defined input regions 212a and peripheral regions 212b corresponding to a set of virtual keys 206 on the input surface 204. The example device 200 may be an alternate embodiment of the device 100 illustrated above with respect to FIG. 1. The device 200 is illustrated as a keyboard-like device with an adaptive input surface 204 surrounded by an enclosure 202. One or more user input regions 212a and peripheral regions 212b surrounding the user input regions 212a are defined along the input surface 204. The input surface 204 includes a display to visually indicate the location and function of a user input region 212a, illustrated here as one of an array of virtual keys 206. An array of electrodes within the input surface 204 tactilely indicates the location of the user input region 212a corresponding to a virtual key 206. The input surface 204 may further incorporate a touch sensor and/or force sensor in order to register touch and/or pressure within the user input region 212a as an input (e.g., the entry of a character represented by the virtual key 206).

The friction-feedback electrodes may particularly indicate a border of the virtual keys 206, or a transition between virtual keys 206. The electrodes may modify friction across the input surface 204 which is perceptible as a user's finger moves across a border or transition region between virtual keys 206. For example, the electrodes within the user input region 212a may be activated (e.g., electrostatically charged) to tactilely indicate the location of the user input region 212a. When active, the electrodes may cause the user to perceive an increased level of friction. The sensation may controllably cause the perception of a rough sensation, or alternatively a sandy, wavy, or similar sensation. The sensations may further be controlled to provide more or less intense sensations. The electrodes may cause a uniform type and intensity of frictional sensation, or the type and intensity may vary across the user input region 212a. For example, the sensation may become more intense as a user's finger nears the peripheral region 212b. The sensations may vary between different virtual keys 206, such as to have a unique sensation on keys such as "F" and "J" in order to allow a user to orient the placement of his or her fingers within the virtual keyboard.

Alternatively, electrodes within the user input region 212a may be inactive while electrodes within the peripheral region 212b may be active. This may provide frictional feedback to a user only where the user's fingers stray outside of the user input region 212a, or the input region 212a and peripheral region 212b may both be active. In such a case, the user input region 212a may have a distinct intensity level and/or type of feedback sensation from the peripheral region 212b, or the two regions may have the same intensity and type of feedback sensation.

The friction-feedback electrodes within the input surface 204 may also be selectively activated according to the location of a user's fingers. For example, the input surface may further include touch sensors, proximity sensors, or other methods to detect the presence and location of a user's finger(s) on or near the surface. Friction-feedback electrodes may therefore only be activated beneath or near the location of a user's finger(s), which may conserve energy consumed in a persistently active input surface.

The actuation of a virtual key 206 may be triggered by the detection of a touch on the input surface 204 corresponding to the virtual key 206. Alternatively or additionally, the actuation of a virtual key 206 may be triggered by the detection of a force on the input surface 204 corresponding to the virtual key 206. The actuation of the key 206 may occur when force exceeding a defined threshold is detected, and the location may be determined by force sensors, touch sensors, or both. The actuation of a virtual key 206 may cause the input device 200 to indicate the actuation, and it may do so by generating a signal indicating entry of a character or function corresponding to the actuated key 206. The indication of the virtual key 206 may be interpreted as user input to the input device, a connected computing device, or a software application. The input device 200 may further transmit the signal to another device in communication with the input device 200.

Figure 3:
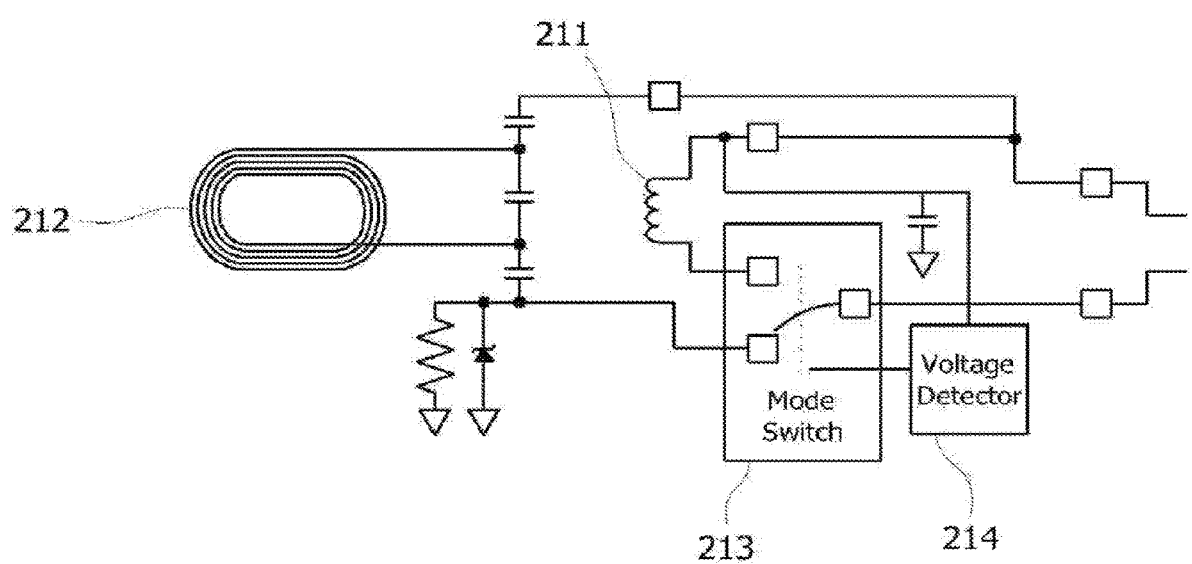
FIG. 3 depicts a simplified cross-sectional view of an adaptive input surface.

FIG. 3 depicts a simplified cross-sectional view of an adaptive input surface 304 having a friction-feedback layer 316 positioned beneath a cover sheet layer 330. In some embodiments, the friction-feedback layer 316 may further be positioned over a substrate layer 314 (e.g., a transparent substrate), which may provide additional rigidity to the cover sheet layer 330. In other embodiments, the substrate layer 314 may be omitted. As shown in the simplified embodiment of FIG. 3, a touch or proximity sensor layer 318 may be positioned between a display 320 and the cover sheet layer 330. However, the relative position of the various layers may change depending on the embodiment.

The friction-feedback layer 316 includes an array of electrodes 328 that are individually controllable to produce tactile feedback at or near the cover sheet layer 330. The cover sheet layer 330 may be a dielectric layer, and may additionally be anti-reflective and/or scratch or impact resistant.

The array of electrodes 328 may be controlled by control circuitry (illustrated below with respect to FIG. 12). Each of the array of electrodes may be individually controlled, or groups of electrodes may be controlled together. The control circuitry may apply a signal to an electrode 328 (or group of electrodes) to activate and/or energize the electrode 328. The signal may cause an electrostatic charge or potential on the electrode 328.

When a user's finger approaches or touches the cover sheet layer 330, the electrostatic charge on the electrode 328 may create and/or increase an attractive force between the finger and the electrode 328. The attractive force may be due to a capacitance formed between the finger, the dielectric cover sheet layer 330, and the electrode 328. The attractive force between the finger and the electrode 328 may cause the finger to be pulled against the cover sheet layer 330. This may in turn increase the friction between the finger and the cover sheet layer 330 as the user slides his or her finger along the cover sheet layer 330. The aforementioned attractive force is generally perpendicular to the direction in which a user moves his or her finger along the cover sheet layer. Accordingly, when the attractive force is present, the user's finger is drawn into greater contact with the cover sheet layer, thereby increasing friction between that layer and the finger (or other object contacting the layer).

The control circuitry may apply distinct signals (e.g., by varying a voltage or current waveform) to different electrodes 328. This results in different electrostatic charges between one electrode and another, such that the attractive force (and therefore friction) varies as a user's finger moves along the cover sheet layer 330. Referring to FIG. 2, for example, a signal applied to electrodes within the peripheral region 212b may have a higher voltage than a signal applied to electrodes within the user input region 212a, which causes an increased friction to a user's finger as it enters the peripheral region 212b, tactilely indicating the edge or border of the virtual key corresponding to the user input region 212a.

In order to create perceptible friction sensations to a user, electrodes 328 in the friction-feedback layer 316 may be energized with electrical signals of approximately 100 to 400 volts (or more, depending on the size and material of the dielectric cover sheet layer 330) and frequencies of approximately 100 to 500 Hertz. Varying the voltage and waveform of the energizing signal may generate varying sensations (e.g., rough, sandy, wavy) and intensity levels to a user. For example, increasing the voltage of the signal to an electrode may increase the attractive force between a finger and the electrode, which in turn causes a more intense sensation of friction.

In general, the density or size of the electrodes 328 in the friction-feedback layer 316 is smaller than the size of a typical defined virtual key or corresponding input region, which may be sized to receive the touch of a single finger. Thus, the feedback sensations may be controlled to provide feedback to a user on, e.g., the size of an input region or the location of edges (e.g., periphery) of the input region or virtual key.

The electrodes 328 may be formed by depositing or otherwise fixing a conductive material (e.g., a transparent conductive material) to a substrate material (e.g., cover sheet layer 330 or substrate layer 314). Potential substrate materials include, for example, glass, sapphire, or transparent polymers like polyethylene terephthalate (PET) or cyclo-olefin polymer (COP). Example transparent conductive materials include polyethyleneioxythiophene (PEDOT), indium tin oxide (ITO), carbon nanotubes, graphene, piezoresistive semiconductor materials, piezoresistive metal materials, silver nanowire, other metallic nanowires, and the like. The transparent conductors may be applied as a film or may be patterned into an array on the surface of the substrate using a suitable disposition technique such as, but not limited to: vapor deposition, sputtering, printing, roll-to-roll processing, gravure, pick and place, adhesive, mask-and-etch, and so on.

In some embodiments, the friction-feedback layer 316 is formed directly on the cover sheet layer 330 or substrate layer 314. Before forming the friction-feedback layer 316, the substrate material may be strengthened using an ion-exchange or other strengthening treatment process. The friction-feedback layer 316 may be formed directly onto the substrate using, for example, a stereo lithographic process or other similar technique for forming one or multiple conductive layers on a substrate. The strengthening and friction-feedback-layer-forming processes may be performed on a sheet of material that is larger than the final shape of the substrate. Thus, after forming the friction-feedback layer 316, in some instances, the final shape of the substrate may be cut from the larger sheet of material. The substrate may then be edge ground and otherwise prepared for assembly with other components of the adaptive input surface 304.

As shown in FIG. 3, the adaptive input surface 304 may further include a touch or proximity sensor layer 318, which may include an array of touch sensors or proximity sensors that are configured to detect the location of a finger or object on or near the cover sheet layer 330. The touch or proximity sensors may operate in accordance with a number of different sensing schemes. In some implementations, the touch or proximity sensors may operate in accordance with a mutual-capacitance sensing scheme. Under this scheme, the touch or proximity sensor layer 318 may include two layers of intersecting transparent traces (e.g., sensing nodes) that are configured to detect the location of a touch by monitoring a change in capacitive or charge coupling between pairs of intersecting traces. In another implementation, the touch or proximity sensor layer 318 may operate in accordance with a self-capacitive sensing scheme. Under this scheme, the touch or proximity sensor layer 318 may include an array of capacitive electrodes or pads (e.g., sensing nodes) that are configured to detect the location of a touch by monitoring a change in self-capacitance of a small field generated by each electrode. In other implementations, a resistive, inductive, or other sensing scheme could also be used.

The sensing nodes may be formed by depositing or otherwise fixing a transparent conductive material to a substrate material. Potential substrate materials include, for example, glass or transparent polymers like polyethylene terephthalate (PET) or cyclo-olefin polymer (COP). Example transparent conductive materials include polyethyleneioxythiophene (PEDOT), indium tin oxide (ITO), carbon nanotubes, graphene, piezoresistive semiconductor materials, piezoresistive metal materials, silver nanowire, other metallic nanowires, and the like. The transparent conductors may be applied as a film or may be patterned into an array on the surface of the substrate using a suitable disposition technique such as, but not limited to: vapor deposition, sputtering, printing, roll-to-roll processing, gravure, pick and place, adhesive, mask-and-etch, and so on.

In some embodiments, the touch or proximity sensor layer 318 is formed directly on a substrate. Before forming the touch or proximity sensor layer 318, the substrate may be strengthened using an ion-exchange or other strengthening treatment process. The sensing nodes may be formed directly onto the substrate using, for example, a stereo lithographic process or other similar technique for forming multiple conductive layers on a substrate. The strengthening and sense-layer-forming processes may be performed on a sheet of material that is larger than the final shape of the substrate. Thus, after forming the sensing nodes, in some instances, the final shape of the substrate may be cut from the larger sheet of material. The substrate may then be edge ground and otherwise prepared for assembly with other components of the adaptive input surface 304. In some embodiments, the touch or proximity sensor layer 318 is formed on the substrate layer 314, though it may be formed on another substrate. The touch or proximity sensor layer 318 may be formed before or subsequent to the formation of the friction-feedback layer 316, or the two layers may be formed concurrently. The touch or proximity sensor layer 318 and friction-feedback layer 316 may be formed by the same or different processes, and may be formed on the same or different substrates.

The sensing nodes of the touch or proximity sensor layer 318 may be operably coupled to touch sensing circuitry to form touch or proximity sensors. The touch sensing circuitry may be configured to detect and estimate the location of a touch on or near the adaptive input surface 304. The touch sensing circuitry may further output signals or other indicia indicating the detected location of a touch. The touch sensing circuitry may be operably coupled to a processing unit as depicted below with respect to FIG. 12, and in some embodiments may be integrated with the processing unit.

As shown in FIG. 3, a display 320 may be positioned below the cover sheet layer 330. The display 320 may be a pixelated display configured to display programmable images and graphic displays. The display 320 may include an organic light emitting diode (OLED) display formed from two layers: an encapsulation layer and a phosphorescent organic layer. The display may also include one of a variety of other types of display elements including, for example, a liquid crystal display (LCD), a light emitting diode (LED) display, an electroluminescent (EL) display, an electrophoretic ink (e-ink) display, and the like.

The adaptive input surface 304 may include additional layers, such as a mechanical stiffener layer 322. The stiffener layer 322 may provide flexural rigidity to the input surface 304. The stiffener layer may be composed of one or more materials such as metals, plastics, glass, and so on that provide a desired flexural rigidity.

As shown in FIG. 3, the adaptive input surface 304 may also include a mechanical actuator 326, or an array of mechanical actuators 326, to provide haptic feedback to a user in addition to the friction-feedback layer 316, as detailed further below with respect to FIGS. 6A-C. A mechanical actuator 326 may provide macro haptic feedback, such as a "click" or similar sensation to mimic the depression of a mechanical key.

The mechanical actuator 326 may be positioned near or within a suspension layer 324. The suspension layer 324 may suspend the input surface 304 within the enclosure of the device. The suspension layer 324 may further provide mechanical compliance, and may work in concert with the actuator to provide macro haptic feedback and/or return the input surface to a home location after macro haptic feedback is complete. The suspension layer 324 may additionally provide impact protection to the device by absorbing and/or dispersing impact energy applied to the input surface 304 or the enclosure.

The suspension layer 324 may further include a force sensor, or an array of force sensors. The force sensors may be used to estimate the magnitude of force applied by one or multiple touches on the cover sheet layer 330. The force sensors may be integrated within the suspension layer 324 or suspension components. Alternatively, similar to the touch or proximity sensor layer 318, the force sensors may form a force layer within or separate from the suspension layer and may include an array of force-sensing structures or force nodes, which may operate in accordance with various force-sensing principles.

In some embodiments, the force nodes are formed from a strain-sensitive material, such as a piezoresistive, piezoelectric, or similar material having an electrical property that changes in response to stress, strain, and/or deflection. Example strain-sensitive materials include carbon nanotube materials, graphene-based materials, piezoresistive semiconductors, piezoresistive metals, metal nanowire material, and the like. Each force node may be formed from an individual block of strain-sensitive material that is electrically coupled to sensing circuitry. Alternatively, each force node may be formed from an electrode pair that is positioned on opposite sides or ends of a strain-sensitive sheet.

In some embodiments, the force nodes are formed from a capacitive force-sensitive structure that includes at least two capacitive plates separated by a compliant or compressible layer. The force of a touch may cause the partial compression or deflection of the compressible layer and may cause the two capacitive plates to move closer together, which may be measured as a change in capacitance using sensing circuitry operatively coupled to each of the force nodes. The change in capacitance, which corresponds to an amount of compression or deflection of the compressible layer, may be correlated to an estimated (applied) force.

Alternatively, the force nodes may operate in accordance with an optical or resistive sensing principle, For example, an applied force may cause a compression of a compliant or compressible layer which may be detected using an optical sensor. In some embodiments, compression of the compressible layer may result in contact between two or more layers, which may be detected by measuring the continuity or resistance between the layers. In other embodiments, the force nodes may be formed from a strain-sensitive material, such as a piezoresistive, piezoelectric, or similar material having an electrical property that changes in response to stress, strain, and/or deflection. Example strain-sensitive materials include carbon nanotube materials, graphene-based materials, piezoresistive semiconductors, piezoresistive metals, metal nanowire material, and the like.

The arrangement and density of the force nodes may vary depending on the implementation. For example, if not necessary to resolve the force for each of multiple touches on the cover sheet layer 330, the force sensors may comprise a single force node. However, in order to estimate the magnitude of force of each of multiple touches on the cover sheet layer 330, multiple force nodes may be used. The density and size of the force nodes will depend on the desired force-sensing resolution. Additionally or alternatively, the force sensors may be used to determine both the location and the force applied to the cover sheet layer 330. In this case the size and placement of the force nodes may depend on the mechanical principle used to determine the location of the touch.

In some embodiments, the touch or proximity sensor layer 318 and a force layer may be formed on a single, shared layer. For example the sensing nodes and the force nodes may be interspersed with each other. The combined touch and force layer may be positioned between the display 320 and the substrate layer 314 or, alternatively, may be positioned below the display 320 on a side opposite to the substrate layer 314.

The force nodes may be operably coupled to force sensing circuitry to form force sensors. The force sensing circuitry may be configured to detect and estimate an amount of force applied to the adaptive input surface 304. In some embodiments, the force sensing circuitry may further detect a location of an applied force. The force sensing circuitry may further output signals or other indicia indicating an estimated amount of applied force. In some embodiments, the force sensing circuitry may include one or more thresholds, and may only output signals in accordance with an applied force exceeding a threshold. The force sensing circuitry may be operably coupled to a processing unit as depicted below with respect to FIG. 12, and in some embodiments may be integrated with the processing unit.

Figure 4:
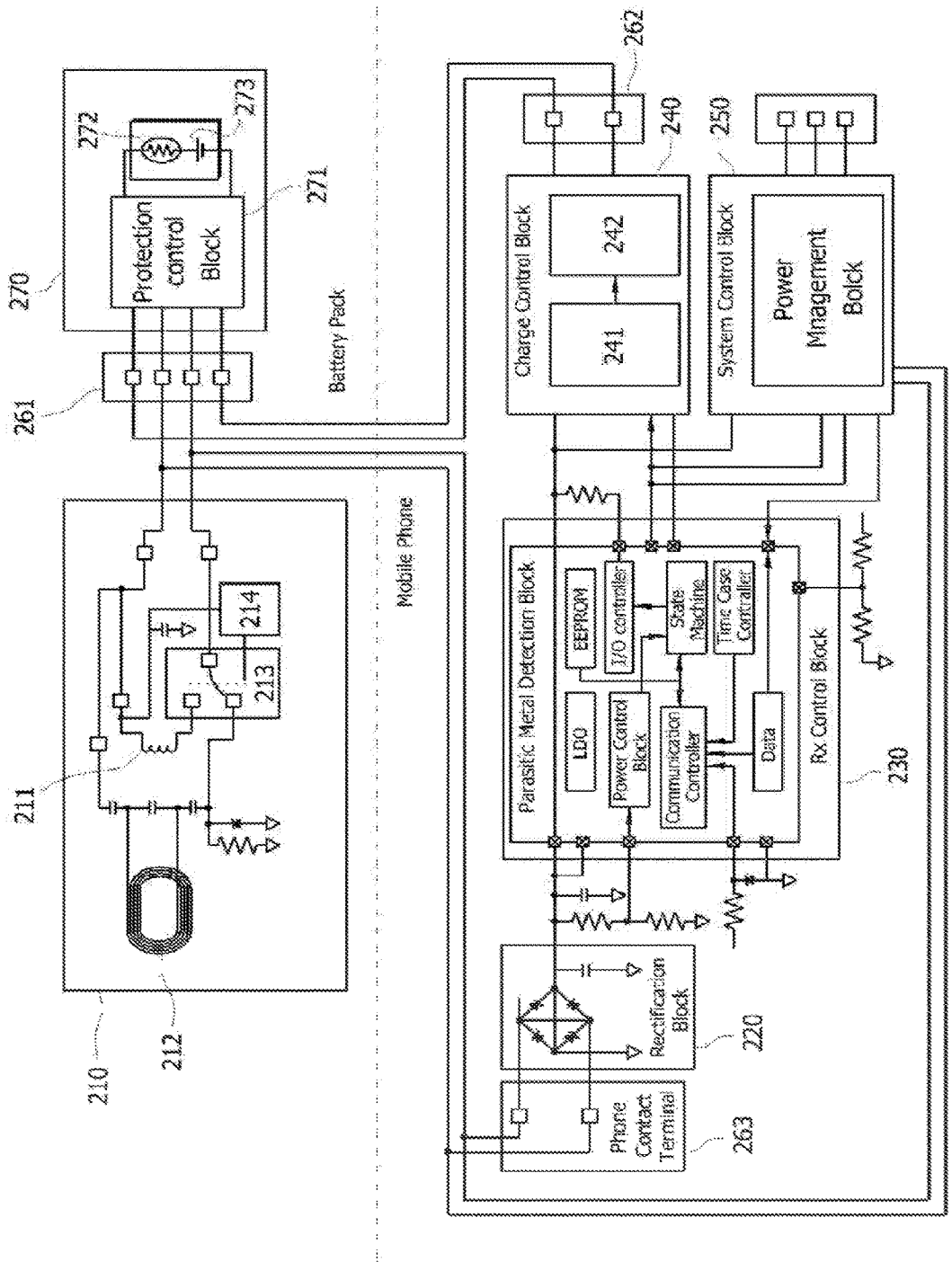
FIG. 4 depicts a schematic of electrodes providing frictional feedback formed in an array of separately controllable pixels.

As illustrated in FIG. 4, the friction-feedback electrodes 428 may be formed in an array of separately controllable pixels. This pixilation of multiple electrodes 428 allows for fine control of tactile feedback across the input surface 404, such that tactile feedback may be provided in multiple locations and offer varying sensations at the same time. While the electrodes are shown arranged in straight rows and columns, they may instead be formed in other patterns, including offset rows and/or columns, or circular or other geometric patterns.

FIG. 4 depicts a schematic view of an adaptive input surface 404. The adaptive input surface 404 is illustrated having an array of electrodes 428 for providing frictional feedback on the adaptive input surface 404. In many embodiments these electrodes 428 would be optically transparent, but are here shown for illustrative purposes. The electrodes 428 may be individually controllable, e.g., by control circuitry within the input device. The control circuitry is further described below with respect to FIG. 12.

As shown in FIG. 4, a first feedback region 412a may be defined within the array of electrodes 428. The first feedback region 412a may define a region that can be tactilely perceived (e.g., detecting the border of a virtual key as a finger moves across the feedback region). The first feedback region 412a may also correspond with a visual representation and/or a user input region, such as one of the keys illustrated in FIG. 1. When a user's finger 432 approaches the first feedback region 412a, electrodes 428 within the first feedback region 412a may be activated. Activation of the electrodes 428 may produce an electrostatic charge and attractive force between the electrodes 428 and the finger 432. As a result, the user may perceive a rough texture or similar frictional feedback as the user slides his or her finger 432 along the input surface 404 over the first feedback region 412a.

Concurrently or subsequently, a second feedback region 412b may be defined and corresponding electrodes 428 activated. As shown, the second feedback region 412b may define a peripheral region (e.g., the edges of a virtual key), such that a user would only receive tactile feedback as his or her finger approaches the peripheral region.

Various shapes and sizes of feedback regions 412a, 412b, 412c, 412d, 412e may be defined within the array of electrodes 428. For example, a larger input region 412c may be defined in addition to the previously defined input regions 412a, 412b. Alternatively or additionally, overlapping feedback regions 412d, 412e may be defined to provide feedback regions where the type or intensity of feedback changes as a user's finger moves. These overlapping feedback regions 412d, 412e may be used to define a border, e.g., of a virtual key. For example, an inner feedback region 412d may provide a low sensation of friction to indicate to a user that his or her finger is within an input region. A surrounding feedback region 412e may have a more intense sensation of friction to indicate to a user that his or her finger has left or is about to leave the input region or virtual key.

Figure 5:
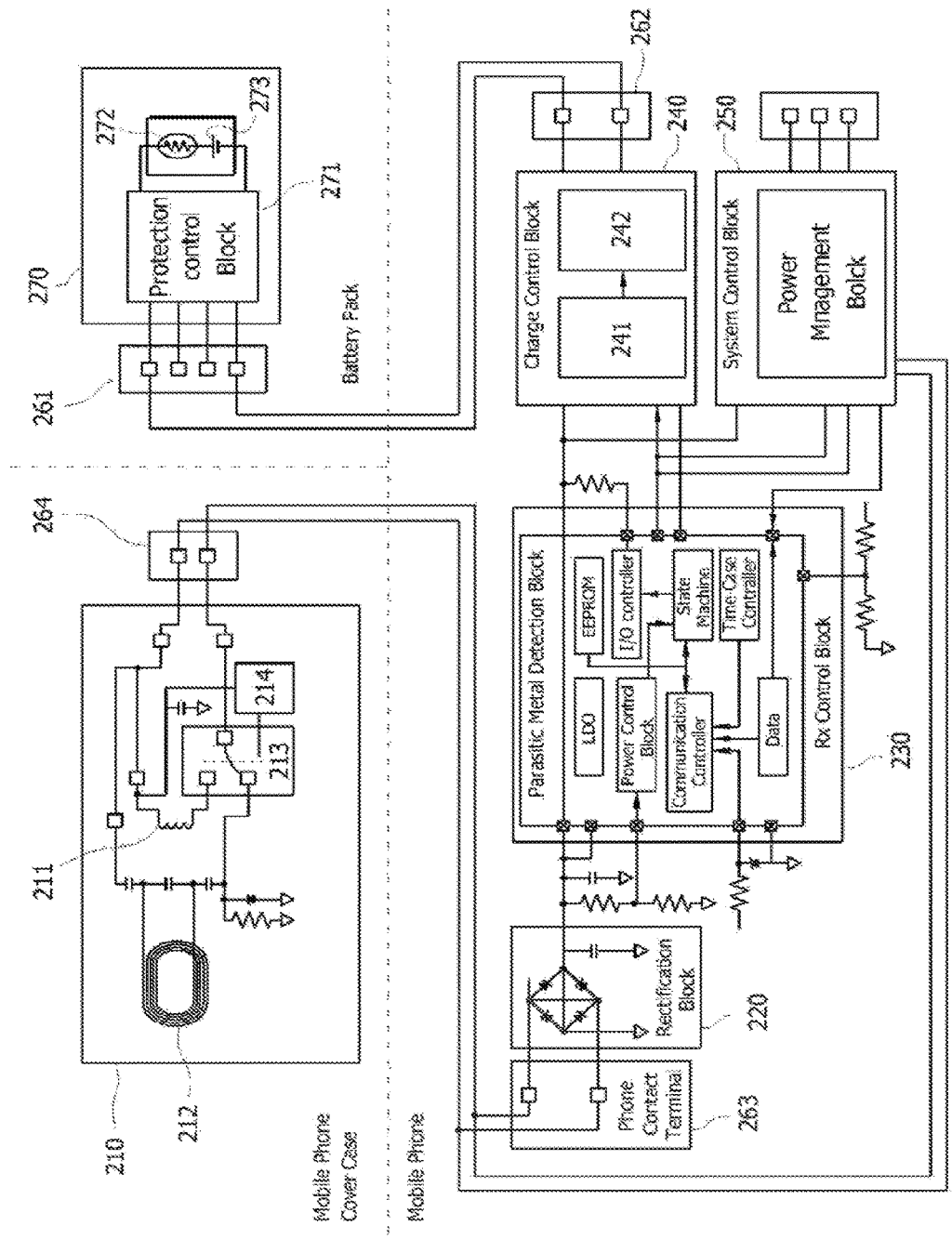
FIG. 5 depicts an input device having frictional feedback surrounding a set of defined input regions.

As shown in FIG. 5, in cases where the adaptive input surface 504 defines a set of input regions in the form of virtual keys 506, friction-feedback electrodes may instead be activated between the set of virtual keys 506, which may allow a user to better tactilely locate the position of the virtual keys 506.

FIG. 5 depicts an example adaptive input surface 504. The adaptive input surface 504 includes an array of separately controllable electrodes for providing frictional feedback, which may be pixelated as depicted in FIG. 4. The adaptive input surface 504 may also include a display and proximity, touch, and/or force sensors operated to define multiple input regions, such as a set of virtual keys 506. In this example, electrodes outside the set of virtual keys 506 are activated (e.g., electrostatically charged) to form an active feedback region 534. Therefore, a user would perceive increased friction on the input surface 504 as a finger is moved toward or into the active feedback region 534, indicating that the finger is no longer within an input region (e.g., virtual key) 506. This may also tactilely indicate to the user a border of the input region or virtual key 506, or a transition between virtual keys 506. A user with multiple fingers in contact with the input surface 504 would be able to perceive the borders of multiple virtual keys 506 at multiple locations concurrently.

Alternatively, electrodes within the user input regions (virtual keys 506) may be active while the space between the keys (region 534) may have a reduced friction. In such embodiments, a user may perceive the border of a user input region (virtual key 506) as one or more fingers cross into the inactive region (region 534) between the user input regions (virtual keys 506).

In some embodiments, the friction-feedback electrodes may be energized in a pattern to create a path of least resistance (friction) as a user's fingers move across the input surface 504. This path of least resistance may operate to guide a user's fingers to the virtual keys 506. For example, a voltage gradient may be formed across electrodes, with the voltage decreasing toward the center of a virtual key 506. Accordingly, a user's fingers may more easily move toward the center, allowing the finger to be drawn to a "home" position over the center of the virtual key 506. A similar path of least resistance or friction may be generated at each virtual key 506, or on a subset of the virtual keys 506 (e.g., the keys "F" and "J" or the home row "A," "S," "D," "F," "J," "K," "L," and ";").

Additionally or alternatively, force sensors and touch or proximity sensors may affect the operation of the friction-feedback electrodes. For example, if an object is detected moving across the input surface 504 with a low force (e.g., indicating a user may be searching for the location of the virtual keys 506), the electrostatic feedback at the active feedback region 534 may be increased to assist a user to find the location of the keys. Once a greater amount of force is detected (e.g., indicating a user's fingers are at rest), the electrostatic feedback may be decreased.

Additional macro haptic feedback may be provided to a user interacting with the input surface 604, as illustrated in FIGS. 6A-F. Macro haptic feedback may allow a user who is, for example, typing on a virtual keyboard defined on the input surface 604 to have a sensation similar to the mechanical motion of a traditional key.

Figure 6A:
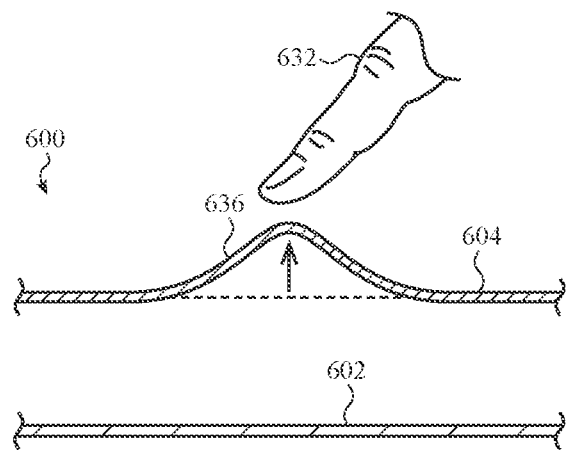
FIG. 6A depicts an example macro haptic feedback response, illustrating a localized deflection of an input surface.
Figure 6B:
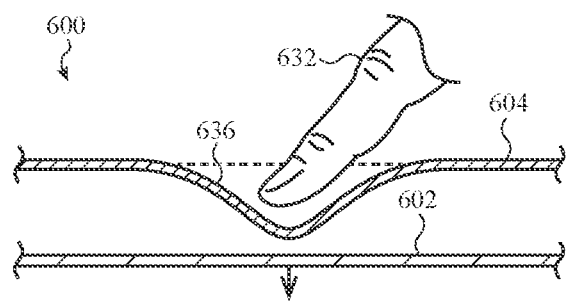
FIG. 6B depicts another example macro haptic feedback response, illustrating a localized depression of an input surface.
Figure 6C:
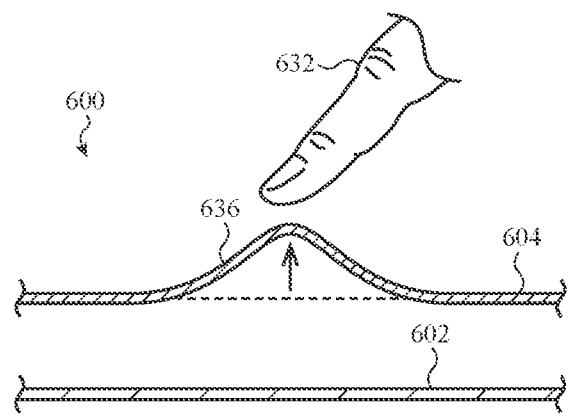
FIG. 6C depicts another example macro haptic feedback response, illustrating a localized return of an input surface to a resting state.
Figure 6D:
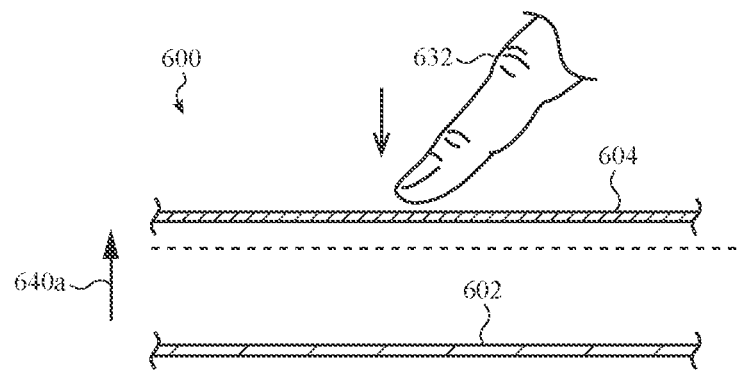
FIG. 6D depicts another example macro haptic feedback response, illustrating a deflection of an input surface.
Figure 6E:
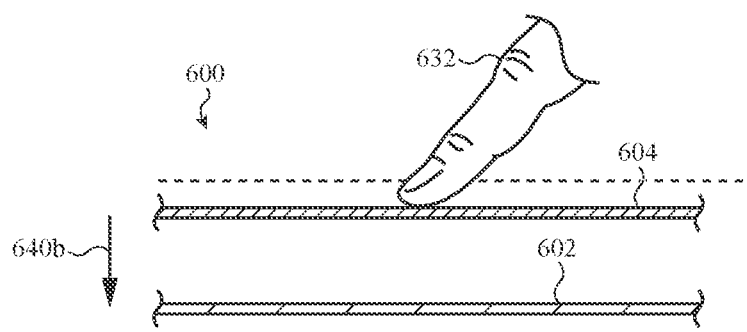
FIG. 6E depicts another example macro haptic feedback response, illustrating a depression of an input surface.
Figure 6F:
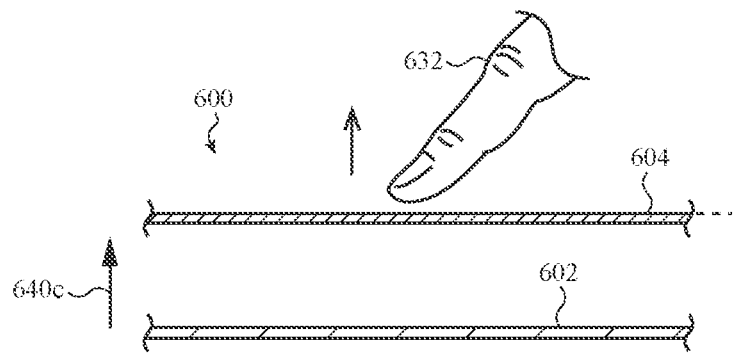
FIG. 6F depicts another example macro haptic feedback response, illustrating a return of an input surface to a resting state.

For example, FIGS. 6A-F illustrate macro haptic feedback as a finger 632 approaches the input surface 604 (FIGS. 6A, 6D), as the finger 632 presses down into the input surface 604 (FIGS. 6B, 6E), and as the finger 632 releases pressure on the input surface 604 (FIGS. 6C, 6F). The macro haptic feedback may be a localized movement of the input surface 604, as depicted in FIGS. 6A-6C. Alternatively or additionally, the macro haptic feedback may move the entire input surface 604, as depicted in FIGS. 6D-F.

In some embodiments, the feedback may consist of one or more of the haptic feedback movements depicted in FIGS. 6A-F, and in some embodiments all three movements may be incorporated. In each of FIGS. 6A-F the motion is shown in an exaggerated form which may not reflect actual movement in practical embodiments.

FIGS. 6A-C depict in simplified schematic form an input device 600 having macro haptic feedback in response to pressure applied to an input surface 604. The input surface 604 may include a macro haptic feedback region 636, which may correspond to a user input region such as a virtual key. As depicted in FIG. 6A, as a finger 632 approaches the input surface 604, sensors such as touch or proximity sensors may detect the presence and/or approach of the finger 632. Once the finger 632 is detected approaching, a macro haptic element, such as an electromechanical actuator (not shown) positioned between the input surface 604 and the enclosure 602, may cause the macro haptic feedback region 636 to move upward to meet the finger 632. For example, an electromechanical actuator operatively coupled to the input surface 604 may be actuated to cause a localized deflection of the input surface 604.

As the finger 632 continues to press downward, the macro haptic element may permit or cause the macro haptic feedback region 636 to move downward as depicted in FIG. 6B. As depicted in FIG. 6C, once the finger 632 moves a threshold distance or releases downward pressure, the macro haptic element may cause the macro haptic feedback region 636 to move upward again, whether returning the macro haptic feedback region 636 to its original position or moving further upward. Whether the movements depicted in FIG. 6A-C are implemented individually or together, they may provide to a user the sensation of a click or motion similar to a key or button press. In some embodiments, multiple such macro haptic feedback regions 636 may be defined and separately controllable across the input surface 604 to provide localized feedback across the input surface 604.

In other embodiments, a subset of the movements depicted in FIGS. 6A-C may be implemented. For example, the input surface 604 may include one or more force sensors configured to estimate an amount of force applied to the surface. If a force sensor estimates an amount of force applied within the macro haptic feedback region 636 (e.g., a finger pressing into the surface), a macro haptic feedback element such as an electromechanical actuator may cause the macro haptic feedback region 636 to "pop" or deflect upwards as depicted in FIG. 6A and quickly return. In other embodiments, the actuator may instead cause the macro haptic feedback region 636 to deflect downward as depicted in FIG. 6B and return in response to an applied force exceeding the threshold.

Alternatively or additionally, macro haptic feedback may be provided through movement of substantially the entire input surface 604. As depicted in FIGS. 6D-F, the entire input surface 604 may be caused to move rather than a portion. The input device 600 may include an input surface 604 suspended above an enclosure 602 by a suspension system (not shown). The suspension system may take many forms, and may be partially or entirely formed by the input surface 604 stack-up illustrated above with respect to FIG. 3. A macro haptic element, such as an electromechanical actuator (not shown) may also be positioned between the input surface 604 and the enclosure 602, such as illustrated above with respect to FIG. 3.

As depicted in FIG. 6D, when a finger 632 is detected approaching the input surface 604, the input surface 604 may be moved upward 640a by the macro haptic element, causing the suspension system to be placed in tension. As the finger 632 continues its downward motion the macro haptic element may permit or cause the input surface to move downward 640b (FIG. 6E), placing the suspension system in compression. Once the finger 632 moves a threshold distance or releases downward pressure, the macro haptic element and/or suspension system may move the input surface upward 640c (FIG. 6F), which may return the input surface to its original position or move it further upward.

As with FIGS. 6A-C, in other embodiments a subset of the movements depicted in FIGS. 6D-F may be implemented. For example, the input surface 604 may include one or more force sensors configured to estimate an amount of force applied to the surface. If a force sensor estimates an amount of force applied to the input surface 604 (e.g., a finger pressing into the surface), a macro haptic feedback element such as an electromechanical actuator may cause the input surface 604 to "pop" or deflect upwards as depicted in FIG. 6D and quickly return. In other embodiments, the actuator may instead cause the input surface 604 to deflect downward as depicted in FIG. 6E and quickly return as depicted in FIG. 6F in response to an applied force exceeding the threshold.

Figure 7A:
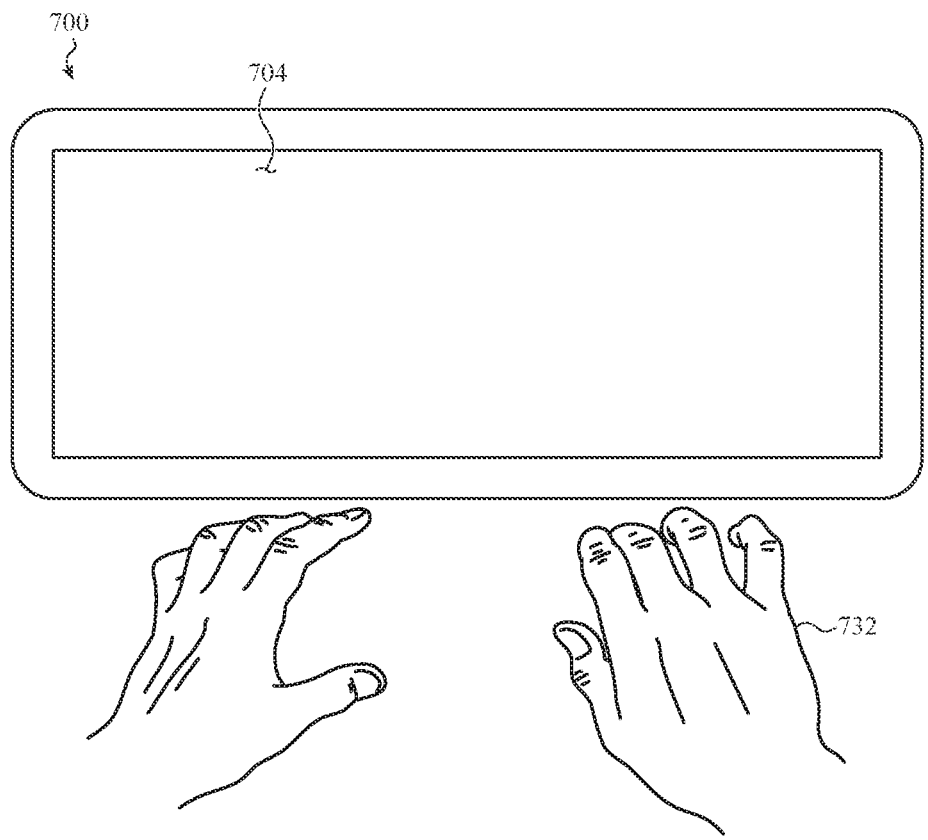
FIG. 7A depicts an input device without user input regions defined on its surface.
Figure 7B:
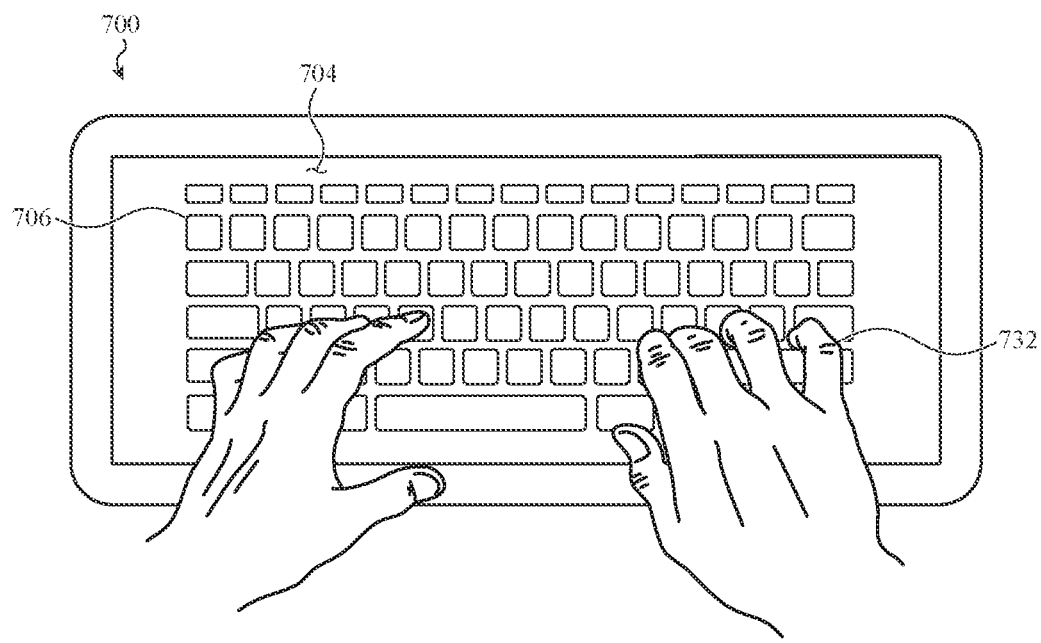
FIG. 7B depicts generation of user input regions on the input device in response to approaching fingers of a user.
Figure 7C:
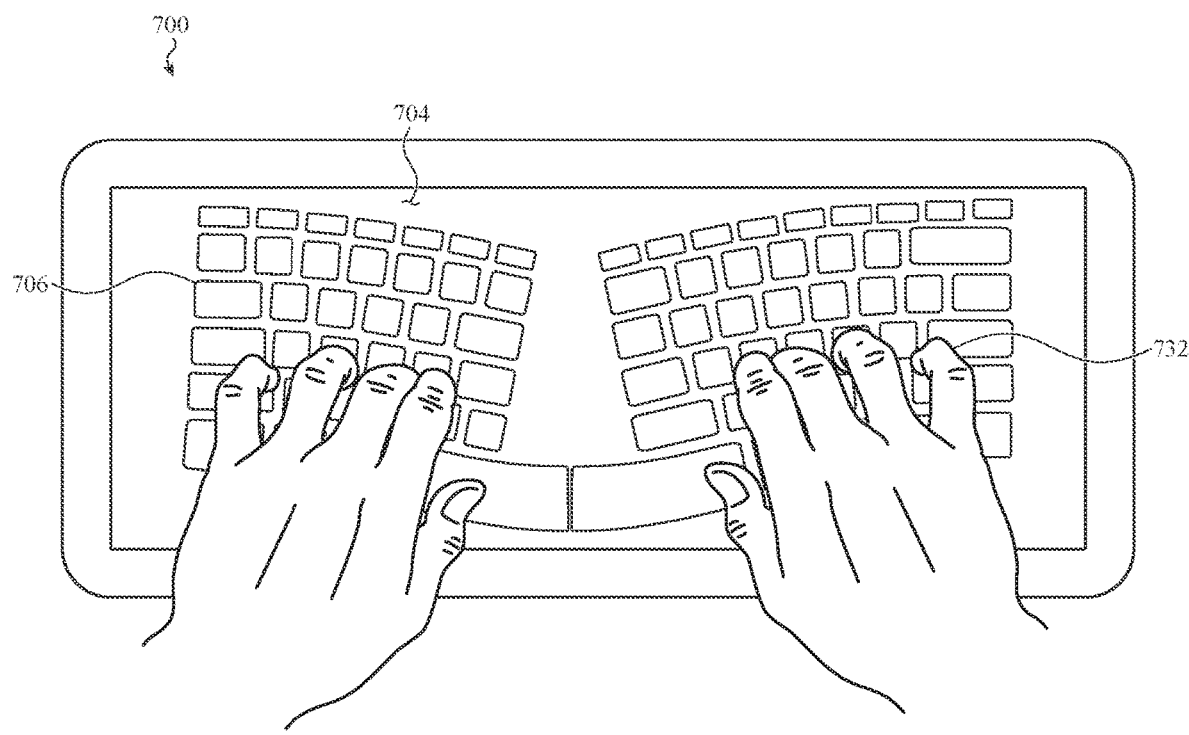
FIG. 7C depicts generation of user input regions on the input device in response to another pattern of approaching fingers of a user.

The input device 700 may also be configured to detect the location of a user's fingers 732 and define multiple input regions and friction-feedback regions according to where and how the user places his or her fingers 732, as depicted in FIGS. 7A-C. It may improve user experience through allowing varying arrangements, sizes, and positions of input areas such as virtual keys 706.

FIGS. 7A-C depict an input device 700 in the shape of a keyboard with an adaptive input surface 704. As depicted in FIG. 7A, the input surface 704 may initially be inactive, with no defined user input regions or visual or tactile indications of input regions. As a user's fingers 732 approach the input surface 704, the input surface 704 may become active as shown in FIG. 7B. For example, the input surface 704 may incorporate proximity sensors, such as touch sensors, which detect the presence and location of the user's fingers 732. These sensors may detect a desired location for defining input regions, such as virtual keys 706. The input regions may alternatively be defined in response to additional user action, such as the performance of a gesture, touching of the input surface 704, or pressing of the input surface 704.

In concurrence with or in response to input regions (e.g., virtual keys 706) being defined on the adaptive input surface 704, the input regions may be indicated visually and/or tactilely. For example, a display within the input surface 704 may visually indicate the location of virtual keys 706. Electrodes within the input surface 704 may be electrostatically charged to provide frictional feedback, tactilely indicating the location of the virtual keys 706. Alternatively, friction-feedback electrodes may be activated at a border or periphery of the virtual keys 706, or both within and outside of the virtual keys 706. Alternatively, the electrodes may be normally inactive and may be activated at a later time in response to user interaction or the detection of a finger near a particular feedback region.

The location of user input regions and corresponding visual and tactile indicia may further be adaptive according to user interaction. For example, the input device 700 may further include computer-readable memory storing multiple keyboard layouts, each of which has a corresponding visual and tactile representation. The layout depicted in FIG. 7B may be a first layout (e.g., a first configuration of virtual keys), while FIG. 7C may be a second layout (e.g., a second configuration of virtual keys). Additional layouts may also be stored within the input device 700, or may be transmitted to the input device 700 by another computing device.

As depicted in FIG. 7C, if a user's fingers are placed in a different arrangement or location, input regions may be differently defined (e.g., according to a second keyboard layout). As illustrated in FIG. 7C, a user's fingers are placed on a previously inactive input surface at an angle to each other rather than a straight line as depicted in FIG. 7B. The input device may recognize this placement as corresponding to an ergonomic keyboard layout (e.g., a second stored keyboard layout), and define input regions (e.g., virtual keys 706), and corresponding visual and tactile indicia of the input regions accordingly.

These examples are illustrative in nature, and further keyboard layouts or input schemes may be implemented according to the present invention, whether due to user interaction, programmed preferences, or software controls through applications in communication with the input device. Multiple keyboard layouts and/or input layouts may be stored in memory, user defined, or application defined. Each keyboard layout and input layout may define the size, number, arrangement, visual appearance, tactile feedback, and so on of user input regions, such as virtual keys 706.

Figure 8:
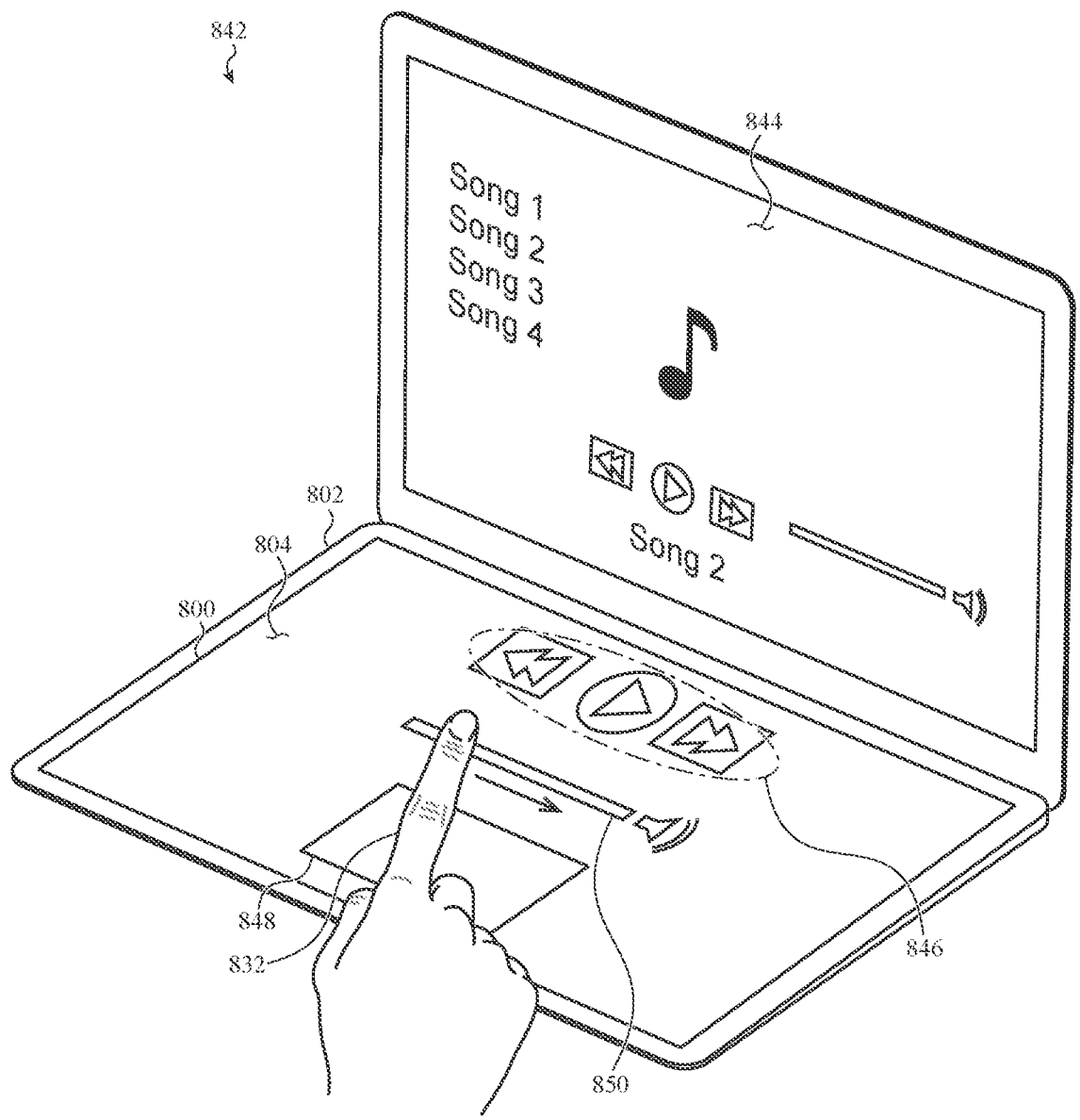
FIG. 8 depicts an example software interaction with the adaptive input surface, illustrating a music playing program.
Figure 9:
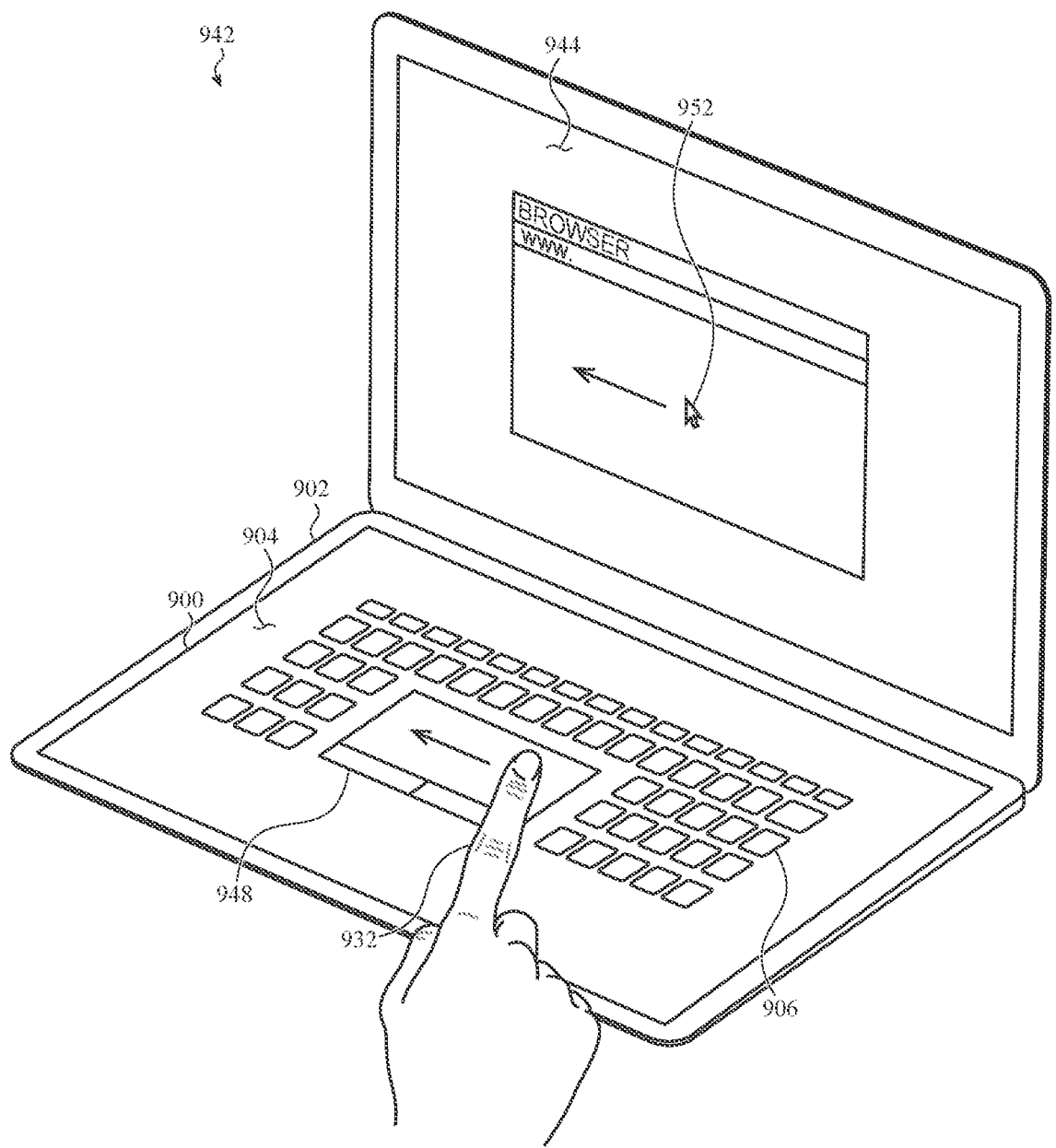
FIG. 9 depicts another example software interaction with the adaptive input surface, illustrating a web browser.

The input device 800 may further communicate with software applications in order to adaptively define user input regions and tactile feedback, as illustrated in FIGS. 8-9. The input device 800 may be a component of another device, such as a laptop computer 842, or it may be in communication with another device, such as a desktop computer, tablet computer, or similar device.

FIG. 8 depicts an example input device 800 incorporated within a laptop computer 842. The laptop computer 842 comprises an enclosure 802 having an upper portion with a display 844 and a lower portion housing an input device 800 according to the present invention. The enclosure may further house various components, such as a processing unit (which may be shared with the processing unit of the input device 800 or may be separate, see the description of FIG. 12 below), memory, computer-readable media, input/output ports, sensors, microphones, speakers, etc.

The input device 800 has an adaptive input surface 804. The input surface 804 is shown adapted to interact with an active software application rendered on the display 844 of the laptop computer 842; here, a music player. The input surface 804 has defined input regions, including media playback controls 846 and a virtual trackpad 848. The input surface 804 also defines an input region and corresponding friction-feedback region for volume control 850. As a user slides a finger 832 along the volume control 850, the electrodes in the user input region corresponding to the volume control may be activated (e.g., electrostatically charged) and provide frictional feedback which increases in intensity as the finger 832 slides to increase volume; the intensity of the frictional feedback may in turn decrease as the finger 832 slides to decrease volume.

In some examples, proximity and/or touch sensors may track the motion of objects along the input surface 804, including the velocity of the motion. Electrostatic feedback may be dynamically adjusted in accordance with the tracked motion. For example, a user may swipe a finger 832 along a portion of the input surface 804 in order to skip to a subsequent track or album in a playlist. The swipe motion may be tracked, and once the finger 832 has moved a threshold distance, electrodes near the finger may provide a distinct feedback to confirm skipping the track (or similarly, flipping a page on an electronic reader application). In other examples, the intensity of electrostatic feedback may increase with greater velocity.

Similarly, FIG. 9 depicts an example input device 900 incorporated within a laptop computer 942. The laptop computer 942 comprises an enclosure 902 having an upper portion with a display 944 and a lower portion housing an input device 900 according to the present invention.

The input device 900 has an adaptive input surface 904. The input surface 904 is shown adapted to interact with an active software application rendered on the display 944 of the laptop computer 942; here, a web browser. Assuming that the input surface 904 previously defined a standard keyboard layout and virtual trackpad 948, as the web browser is opened the virtual keys 906 may be shifted and/or truncated while the virtual trackpad 948 may be repositioned to the center of the input surface 904. With the virtual trackpad 948 more prominently located, a user 932 may more easily navigate web pages which may frequently require moving a pointer 952 and clicking links.

The virtual trackpad 948 may define a separate movement region for moving the pointer 952 and a virtual button region for selecting or clicking items. Tactile feedback within the regions may differ. For example, electrodes within the virtual trackpad 948 may cause a user to perceive increased friction as the user's finger 932 approaches the edges of the movement region to tactilely indicate the border of the region. The virtual button region may have macro haptic elements activated such that touching or pressing the virtual button may result in a click feel, as illustrated above with respect to FIGS. 6A-F.

Figure 10:
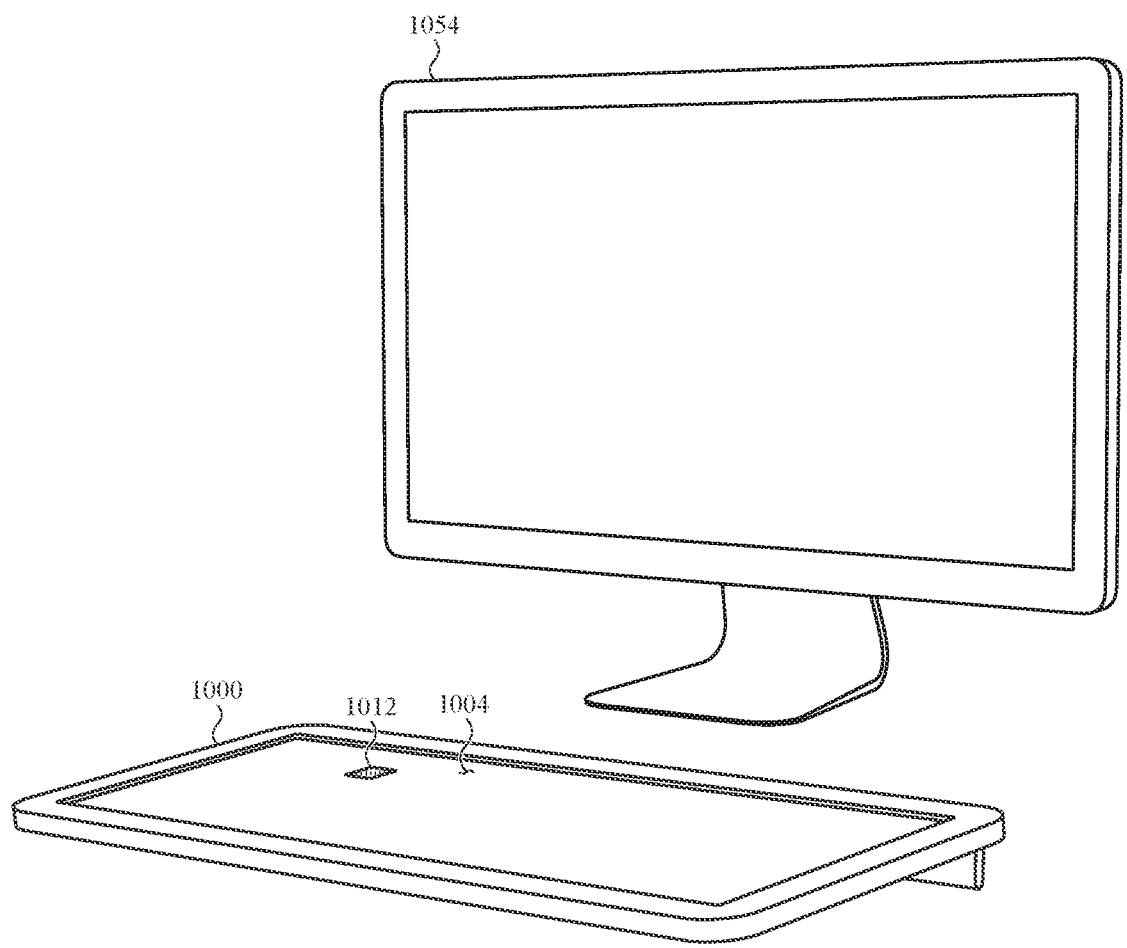
FIG. 10 depicts an example embodiment of the present invention, illustrating a desktop computer and keyboard.
Figure 11:
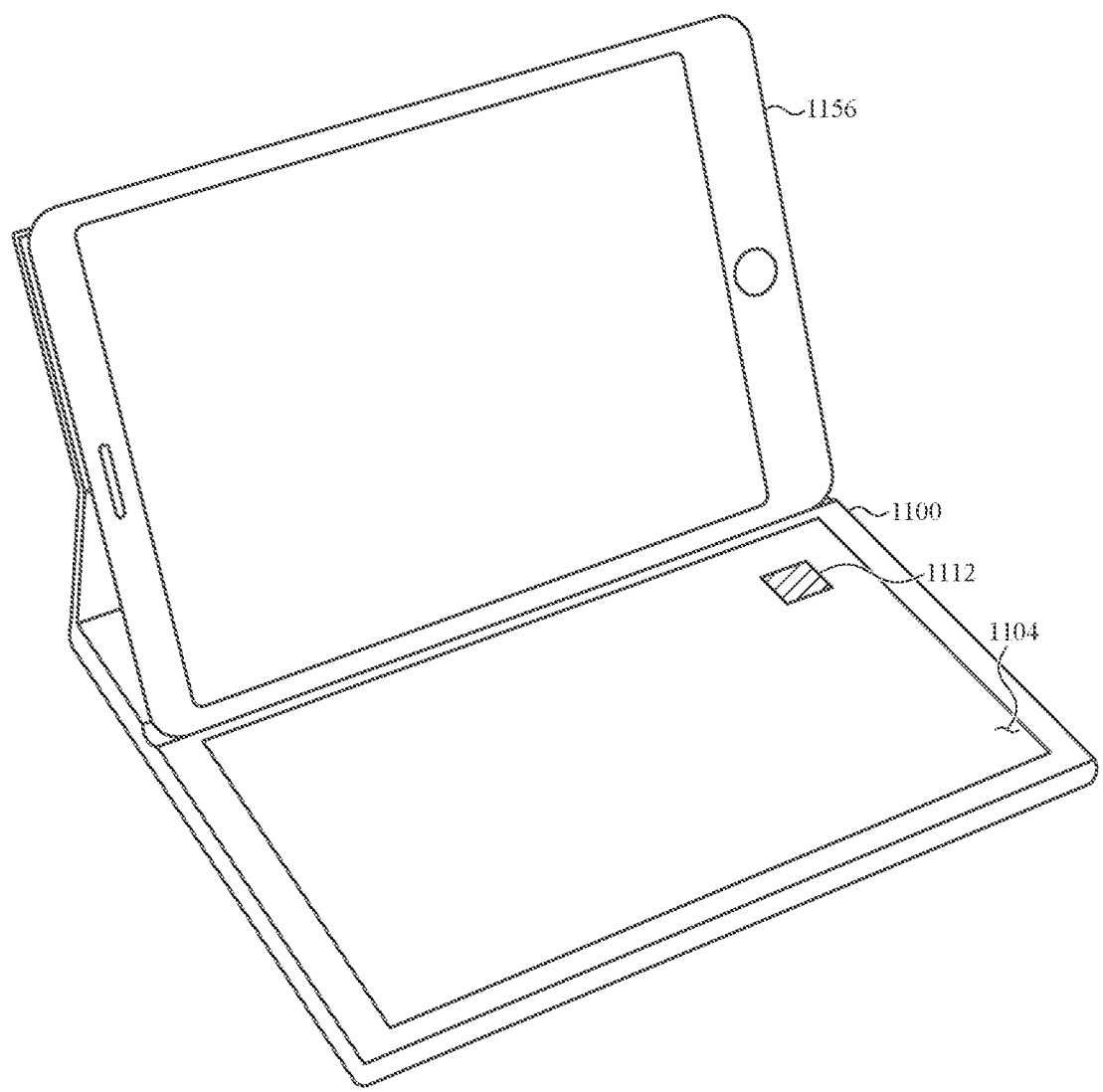
FIG. 11 depicts an example embodiment of the present invention, illustrating a tablet computing device and keyboard.

As illustrated in FIGS. 10-11, an input device according to the present invention may be implemented in many forms. Input devices according to the present invention may take the form of a keyboard, mouse, trackpad, or other input devices. An input device may be incorporated into a device such as a laptop computer, as shown above with respect to FIGS. 8 and 9, or an input device may be a separate device in communication with a host computer or other device as illustrated with respect to FIG. 10. The adaptive input surface of the present invention may also be incorporated into separate multipurpose devices or accessories, such as a case for a portable electronic device as illustrated with respect to FIG. 11.

FIG. 10 depicts an example input device 1000 in communication with a desktop computer 1054. The input device 1000 may be in communication with the desktop computer 1054 through a wired or wireless connection. The input device 1000 has an enclosure and an adaptive input surface 1004 positioned within the enclosure. The input surface 1004 defines a user input region 1012, which may be tactilely indicated by causing a user to experience varying friction while moving a finger across the user input region 1012.

FIG. 11 depicts an example input device 1100, incorporated into a cover case. The cover case may be attached to and in communication with a portable tablet computing device 1156. The input device 1100 may be in communication with the tablet 1156 through a wired connection, an electrical contact connection, or a wireless connection. The input device 1100 has an adaptive input surface 1104 which defines a user input region 1112. Electrodes within or around the input region may tactilely indicate the location of the input region, such as by causing a user to experience varying friction while moving a finger across the user input region 1112.

The example devices illustrated in the above figures are intended to be illustrative in nature, and can be implemented in a number of other manners. Further, while the above examples are illustrated with flat, generally smooth input surfaces, the present invention can also be implemented using curved, bent, textured, rough, and other types of surfaces.

Figure 12:
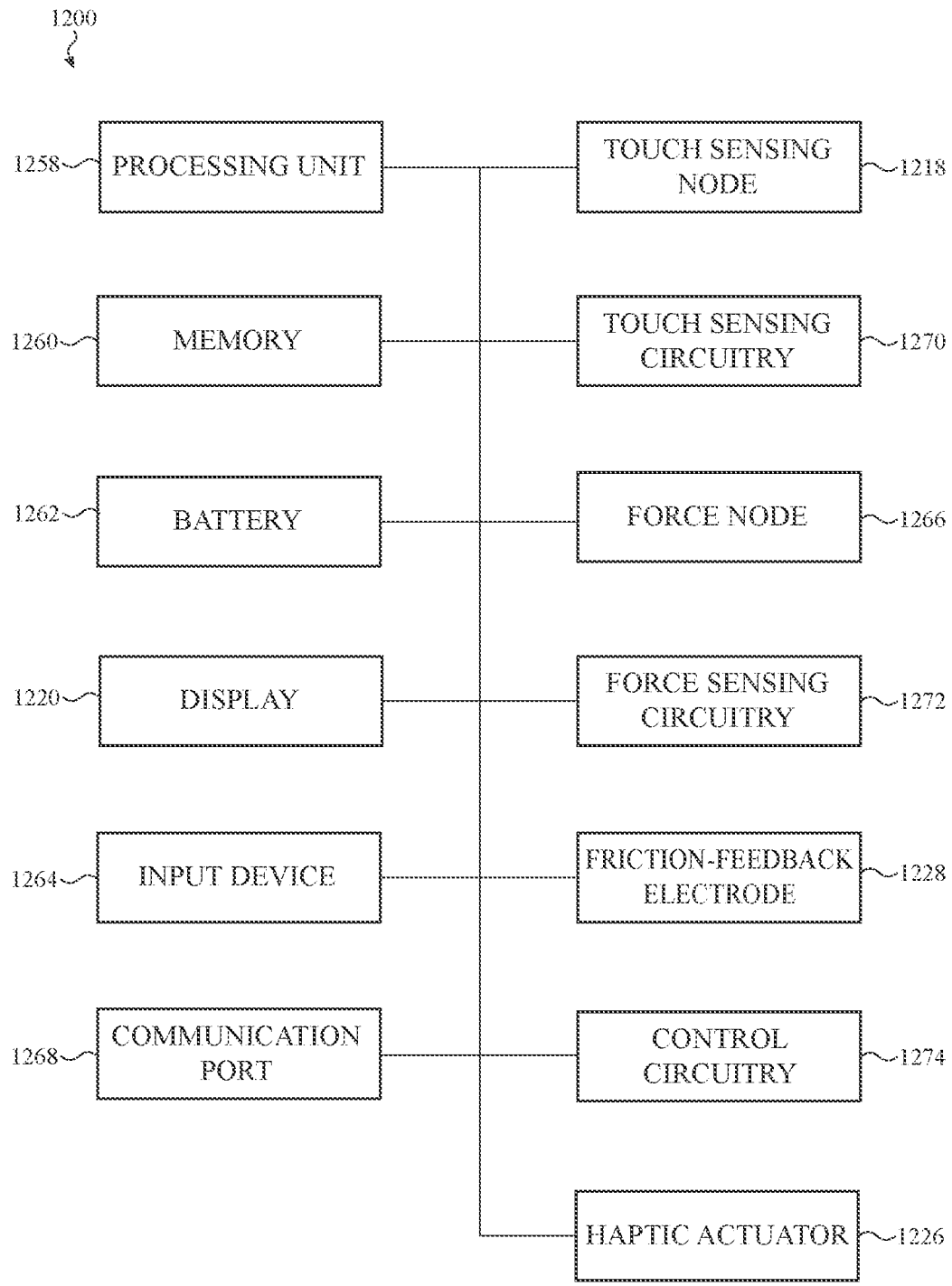
FIG. 12 depicts an example system diagram.

FIG. 12 depicts example components of an electronic input device in accordance with the embodiments described herein. The schematic representation depicted in FIG. 12 may correspond to components of the devices depicted in FIGS. 1-11, described above. However, FIG. 12 may also more generally represent other types of devices that include controllable haptic feedback elements in accordance with the embodiments described herein.

As shown in FIG. 12, a device 1200 includes a processing unit 1258 operatively connected to computer memory 1260. The processing unit 1258 may be operatively connected to the memory 1260 component via an electronic bus or bridge. The processing unit 1258 may include one or more computer processors or microcontrollers that are configured to perform operations in response to computer-readable instructions. Where incorporated into a larger device such as a laptop computer, the processing unit 1258 may be the central processing unit (CPU) of the larger device. Additionally or alternatively, the processing unit 1258 may include other processors within the device 1200 including application specific integrated chips (ASIC) and other microcontroller devices. The processing unit 1258 may be configured to perform functionality described in the examples above.

The memory 1260 may include a variety of types of non-transitory computer-readable storage media, including, for example, read access memory (RAM), read-only memory (ROM), erasable programmable memory (e.g., EPROM and EEPROM), or flash memory. The memory 1260 is configured to store computer-readable instructions, sensor values, and other persistent software elements.

In some embodiments, the memory 1260 may store one or more keyboard and/or input layouts, such as illustrated with respect to FIGS. 7B, 7C, 8, and 9. Different layouts may define the size, number, arrangement, visual appearance, tactile feedback, and so on of user input regions, such as virtual keys.

In this example, the processing unit 1258 is operable to read computer-readable instructions stored on the memory 1260. The computer-readable instructions may adapt the processing unit 1258 to perform the operations or functions described above with respect to FIGS. 1-11. The computer-readable instructions may be provided as a computer-program product, software application, or the like.

The device 1200 may also include a battery 1262 that is configured to provide electrical power to the components of the device 1200. The battery 1262 may include one or more power storage cells that are linked together to provide an internal supply of electrical power. The battery 1262 may be operatively coupled to power management circuitry that is configured to provide appropriate voltage and power levels for individual components or groups of components within the device 1200. The battery 1262, via power management circuitry, may be configured to receive power from an external source, such as an AC power outlet. The battery 1262 may store received power so that the device 1200 may operate without connection to an external power source for an extended period of time, which may range from several hours to several days.

The device 1200 may also include a display 1220 (such as illustrated in FIG. 3). The display 1220 may include a liquid crystal display (LCD), organic light emitting diode (OLED) display, electroluminescent (EL) display, electrophoretic ink (e-ink) display, or the like. If the display 1220 is an LCD or e-ink type display, the display 1220 may also include a backlight component that can be controlled to provide variable levels of display brightness. If the display 1220 is an OLED or EL type display, the brightness of the display 1220 may be controlled by modifying the electrical signals that are provided to display elements.

In some embodiments, the device 1200 includes one or more input devices 1264. The input device 1264 is a device that is configured to receive user input. The input device 1264 may include, for example, a push button, a touch-activated button, or the like. In some embodiments, the input device 1264 may provide a dedicated or primary function, including, for example, a power button, volume buttons, home buttons, scroll wheels, and camera buttons. Generally, a touch sensor and a force sensor may also be classified as input devices. However, for purposes of this illustrative example, the touch sensor (touch sensing node 1218 and touch sensing circuitry 1270) and force sensor (force node 1266 and force sensing circuitry 1272) are depicted as distinct components within the device 1200.

The device 1200 may also include a touch and/or proximity sensing node 1218 that is configured to determine a location of a finger or touch over the adaptive input surface of the device 1200. The touch or proximity sensing node 1218 may be one of a capacitive array of electrodes or nodes that operate in accordance with a mutual-capacitance or self-capacitance scheme.

The device 1200 may also include touch sensing circuitry 1270, which may be operably coupled to the touch and/or proximity sensing node 1218 to form a touch sensor. The touch sensing circuitry 1270 may be configured to detect and estimate the location of a touch on or near the adaptive input surface as measured by the touch sensing node 1218. The touch sensing circuitry 1270 may further output signals or other indicia indicating the detected location of a touch. The touch sensing circuitry 1270 may further be operably coupled to the processing unit 1258.

The device 1200 may also include a force node 1266 in accordance with the embodiments described herein. As previously described, the force node 1266 may be configured to receive force touch input over the adaptive input surface of the device 1200. The force node 1266 may be implemented in one or more force-sensitive layers including force-sensitive structures that are responsive to a force or pressure applied to an external surface of the device. As described above with respect to FIG. 3, the force node 1266 may be implemented as part of another element within the device 1200, such as a suspension system.

The device 1200 may also include force sensing circuitry 1272, which may be operably coupled to the force node 1266 to form a force sensor. The force sensing circuitry 1272 may be configured to detect and estimate an amount of force applied to the adaptive input surface as measured by the force node 1266. In some embodiments, the force sensing circuitry 1272 may further detect a location of an applied force. The force sensing circuitry 1272 may further output signals or other indicia indicating an estimated amount of applied force. In some embodiments, the force sensing circuitry 1272 may be configured to operate using a dynamic or adjustable force threshold. The force sensing circuitry 1272 may only output signals in accordance with an applied force exceeding the force threshold. The force sensing circuitry 1272 may further be operably coupled to the processing unit 1258.

The device 1200 may also include one or more electrodes 1228 to provide frictional feedback to a user in contact with the adaptive input surface. The electrodes 1228 may be arrayed as illustrated in FIG. 4 and be controlled by control circuitry 1274. The electrodes 1228 may be individually controllable electrodes which when energized create an attractive force with a finger or other object near or in contact with the input surface.

The device 1200 may also include control circuitry 1274, which may be operably connected to and provide control for the friction-feedback electrodes 1228. The control circuitry 1274 may provide control of individual and/or groups of electrodes 1228 in order to modify frictional feedback across the adaptive input surface. The control circuitry 1274 may provide energizing electrical signals to the electrodes 1228, and may control the voltage, frequency, waveform, and other features of the electrical signal to provide varying feedback to a user. The control circuitry 1274 may further be operably coupled to the processing unit 1258.

The device 1200 may also include a haptic actuator 1226. The haptic actuator 1226 may be controlled by the processing unit 1258, and may be configured to provide macro haptic feedback to a user interacting with the device 1200, such as illustrated above with respect to FIGS. 6A-C. In some embodiments, multiple haptic actuators 1226 may provide localized macro haptic feedback at different areas of the input surface.

The device 1200 may also include a communication port 1268 that is configured to transmit and/or receive signals or electrical communication from an external or separate device. The communication port 1268 may be configured to couple to an external device via a cable, adaptor, or other type of electrical connector. In some embodiments, the communication port 1268 may be used to couple the device 1200 to a host computer. The communication port 1268 may be configured to receive control information from an external device, which may be used to operate the adaptive input surface and/or display The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. An input device having a configurable interface, and comprising:
   a cover sheet defining an input surface;
   a display positioned below the cover sheet and configured to visually indicate an array of keys on the input surface;
   an array of electrodes positioned below the cover sheet and configured to provide a first frictional feedback within each key of the array of keys and a second frictional feedback, distinct from the first frictional feedback, along a periphery of each key of the array of keys;
   an array of proximity sensing elements configured to detect a location of an object on or near the input surface; and
   a macro haptic feedback element associated with a macro haptic feedback region on the input surface, the macro haptic feedback element being configured to vertically transition the macro haptic feedback region in response to the array of proximity sensing elements detecting the object on or near the macro haptic feedback region.

2. The input device of claim 1, wherein the second frictional feedback is greater than the first frictional feedback.

3. The input device of claim 1, further comprising:
   an actuator positioned below the cover sheet and configured to cause haptic feedback on the input surface in response to the array of proximity sensing elements detecting the object on or near one of the array of keys.

4. The input device of claim 1, wherein:
   the array of electrodes is configured to provide the first frictional feedback and the second frictional feedback in response to the array of proximity sensing elements detecting the object on or near one of the array of keys.

5. The input device of claim 1, wherein:
   the array of electrodes is configured to increase the second frictional feedback for a first key of the array of keys in response to the array of proximity sensing elements detecting the object touching the first key.

6. The input device of claim 1, further comprising a force sensor configured to detect an amount of force applied at the input surface.

7. The input device of claim 6, further comprising:
   a touch sensor configured to detect a location of a touch on the input surface; and
   a processing unit operably coupled to the touch sensor, the force sensor, and the array of electrodes; wherein:
   the processing unit is configured to generate a signal indicating actuation of a first of the array of keys in response to outputs from the touch sensor and the force sensor.

8. A method of providing friction feedback on an input device, comprising:
   detecting a location of an object near a surface of the input device;
   defining a user input region along the surface based on the location of the object;
   visually rendering a location of the user input region on a display positioned below the surface;
   providing, using an array of electrodes, a first electrostatic frictional feedback at a periphery of the user input region; and
   providing, using the array of electrodes, a second electrostatic frictional feedback that is distinct from the first electrostatic frictional feedback, the first electrostatic frictional feedback and the second electrostatic frictional feedback being within the user input region; and
   increasing the intensity of the first and second frictional feedback as the location of the object on or near the input surface approaches a periphery of a key within the user input region.

9. The method of claim 8, further comprising:
   detecting an amount of force applied to the surface within the user input region; and
   in response to detecting the amount of force exceeding a threshold, indicating entry of an input corresponding to the user input region.

10. A method of providing friction feedback on an input device, comprising:
    detecting a location of an object near a surface of the input device;
    defining a user input region along the surface based on the location of the object;
    visually rendering a location of the user input region on a display positioned below the surface;
    providing, using an array of electrodes, an electrostatic charge at the surface, the electrostatic charge generating an attractive force between the surface and an object on or near the surface to provide a frictional feedback; and
    defining an array of virtual keys along the surface comprising user input regions based on the location of the object.

11. The method of claim 8, further comprising:
    detecting an amount of force exceeding a threshold applied to the surface;
    in response to the amount of force exceeding the threshold, operating an actuator to provide haptic feedback.

12. The method of claim 8, wherein the first electrostatic frictional feedback is greater than the second frictional-feedback.

13. The method of claim 8, wherein the user input region is a first user input region and wherein the method further includes defining additional user input regions.

14. The method of claim 8, further comprising:
generating, using a processing unit, a signal indicating actuation of the user input region in response to a touch input on the surface within the user input region.

15. The method of claim 10, further comprising:
detecting an amount of force applied to the surface within the user input region; and
in response to detecting the amount of force exceeding a threshold, indicating entry of an input corresponding to the user input region.

16. The method of claim 10, further comprising:
detecting an amount of force exceeding a threshold applied to the surface;
in response to the amount of force exceeding the threshold, operating an actuator to provide haptic feedback.

17. The method of claim 10, wherein the location of the object near the surface of the input device is detected by an array of proximity sensing elements.

18. The method of claim 10, further comprising:
generating, using a processing unit, a signal indicating actuation of a first virtual key of the array of virtual keys in response to a touch input on the surface.

19. The input device of claim 1, wherein an intensity of the first and second frictional feedback increases as a location of an object on or near the input surface approaches the periphery of a key of the array of keys.

20. The input device of claim 1, wherein the array of electrodes are configured to generate an electrostatic charge at the cover sheet, the electrostatic charge generating an attractive force between the cover sheet and an object on or near the input surface to provide the first frictional feedback and the second frictional feedback.

\* \* \* \* \*